(12) United States Patent
Spencer et al.

(10) Patent No.: US 9,185,947 B2
(45) Date of Patent: Nov. 17, 2015

(54) FORMING PORTION OF AN ARTICLE FROM FABRICATION SCRAP, AND PRODUCTS THEREOF

(75) Inventors: Karen N. Spencer, Beaverton, OR (US); Benjamin A. Shaffer, Portland, OR (US)

(73) Assignee: NIKE, Inc., Beaverton, OR (US)

(*) Notice: Subject to any disclaimer, the term of this patent is extended or adjusted under 35 U.S.C. 154(b) by 733 days.

(21) Appl. No.: 13/051,903

(22) Filed: Mar. 18, 2011

(65) Prior Publication Data
US 2012/0233883 A1 Sep. 20, 2012

(51) Int. Cl.
| A43B 23/00 | (2006.01) |
| A43B 1/12 | (2006.01) |
| A43B 23/02 | (2006.01) |
| B29B 17/00 | (2006.01) |
| B29B 17/04 | (2006.01) |
| A43B 13/04 | (2006.01) |
| B29K 75/00 | (2006.01) |
| B29L 31/50 | (2006.01) |

(52) U.S. Cl.
CPC .............. *A43B 1/12* (2013.01); *A43B 23/0215* (2013.01); *B29B 17/0042* (2013.01); *B29B 17/04* (2013.01); *A43B 13/04* (2013.01); *B29K 2075/00* (2013.01); *B29L 2031/505* (2013.01); *Y02W 30/62* (2013.01); *Y02W 30/625* (2013.01); *Y02W 30/683* (2013.01)

(58) Field of Classification Search
CPC .. A43B 23/0235; A43B 1/04; A43B 23/0205; A43B 23/0245; A43B 23/0255; A43B 23/026; A43B 23/0265; A43B 23/0215; A43B 23/0275; A43B 23/025; A43B 3/0078; A43B 1/0027; A43B 23/0225; A43B 23/024; A43B 23/027
USPC ............ 36/45, 25 R, 20 R, 30 R, 31, 32, 103; 12/142 R, 146 C
See application file for complete search history.

(56) References Cited

U.S. PATENT DOCUMENTS

| 1,687,441 | A | * | 10/1928 | Grosjean .......................... 428/54 |
| 4,054,706 | A | | 10/1977 | Shapiro |
| 4,438,221 | A | * | 3/1984 | Fracalossi et al. ............... 521/55 |

(Continued)

FOREIGN PATENT DOCUMENTS

| CN | 1480078 | 3/2004 |
| CN | 1711929 | 12/2005 |

(Continued)

OTHER PUBLICATIONS

Web page titled "Nike's Trashy Sneakers: Top Honors at Design Awards: TreeHugger" (downloaded from <http://www.treehugger.com> on Feb. 1, 2011).

(Continued)

*Primary Examiner* — Clinton T Ostrup
*Assistant Examiner* — Catherine M Ferreira
(74) *Attorney, Agent, or Firm* — Banner & Witcoff, Ltd.

(57) ABSTRACT

Material scraps can be collected and resized. The resized scrap can be distributed to create a recovered material layer, which layer (with or without one or more carrier layers and/or additional elements) can then be subjected to heat and/or pressure so as to create a pliable composite panel. That pliable composite panel, or a portion thereof, may then be used to create an upper shell or another article.

14 Claims, 17 Drawing Sheets

(56) References Cited

U.S. PATENT DOCUMENTS

| | | | |
|---|---|---|---|
| 4,443,286 A * | 4/1984 | Ikeda et al. | 156/245 |
| 5,346,934 A * | 9/1994 | Chriss | 524/11 |
| 5,586,354 A | 12/1996 | Chi | |
| 5,671,495 A | 9/1997 | Chen | |
| 5,718,063 A | 2/1998 | Yamashita et al. | |
| 7,065,820 B2 | 6/2006 | Meschter | |
| 8,156,663 B2 * | 4/2012 | Shelton et al. | 36/25 R |
| 2002/0056207 A1 * | 5/2002 | Chen | 36/33 |
| 2005/0275128 A1 | 12/2005 | Hsiao et al. | |
| 2006/0130363 A1 | 6/2006 | Hottinger | |
| 2006/0162183 A1 | 7/2006 | Polegato Moretti | |
| 2006/0179684 A1 | 8/2006 | Levy | |
| 2010/0293814 A1 * | 11/2010 | Skaja et al. | 36/25 R |

FOREIGN PATENT DOCUMENTS

| | | | | |
|---|---|---|---|---|
| DE | 202004007688 | 9/2004 | | |
| FR | 826955 | 4/1938 | | |
| GB | 22266 | 0/1913 | | |
| GB | 2456177 | 7/2009 | | |
| JP | 2004344600 | 12/2004 | | |
| WO | 9818863 | 5/1998 | | |
| WO | WO2006034807 | * 4/2006 | | A43B 1/14 |
| WO | 2009042599 | 4/2009 | | |
| WO | 2012037709 | 3/2012 | | |

OTHER PUBLICATIONS

Web page titled "Stave Nash and Nike Zoom MVP Trash Talk Shoe Continue Going Green" (downloaded from <http://www.bizofbasketball.com> on Feb. 1, 2011).

Web page titled "Nike Trash Talk X Steve Nash—Sneaker Releases—Sneaker Freaker Magazine" (downloaded from <http://www.sneakerfreaker.com> on Feb. 1, 2011).

International Search Report and Written Opinion of PCT/US2012/027527 mailed Jun. 8, 2012.

* cited by examiner

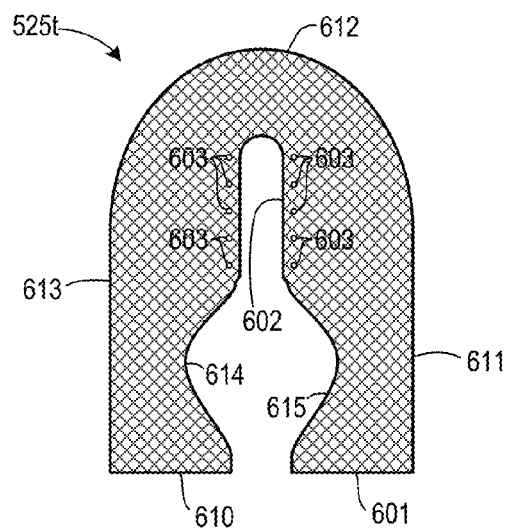
FIG. 6
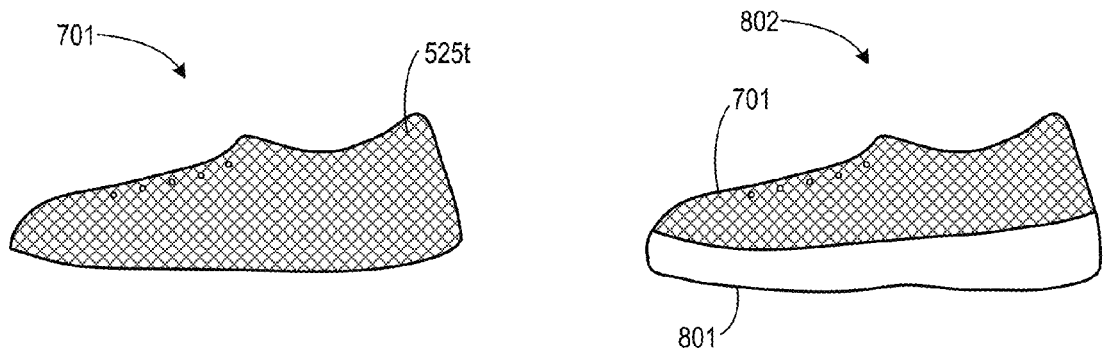
FIG. 7   FIG. 8

FORMING PORTION OF AN ARTICLE FROM FABRICATION SCRAP, AND PRODUCTS THEREOF

BACKGROUND

For many types of footwear, a manufacturer creates an upper by cutting one or more sheet material elements from a larger panel of that same material. The manufacturer may, depending on the shoe design, join together multiple cut elements to create an upper shell. This shell can then undergo further fabrication operations and ultimately be joined to a sole structure.

Cutting upper elements from larger sheets of material creates scrap. After cutting elements from a stock material sheet, for example, the remaining parts of that sheet may be too small for use in other aspects of the upper fabrication process. Reducing scrap is often an important factor when planning production. For example, a manufacturer may cut elements from a larger sheet by arranging cutting dies so as to maximize the number of elements obtained from that sheet. In some cases, the design for a shoe upper may be affected by the amount of scrap likely to be generated. For example, a designer might desire a particular shape for an upper element so as to achieve a particular aesthetic or to achieve some other goal. However, it may be difficult to cut that shape from commercially available sheets of a particular material without leaving large amounts of unusable scrap. As a result, the designer may be forced to change the shape of the upper element so that more of the commercially available sheet can be utilized.

Even in moderately sized production runs, a large volume of scrap might be generated. Such scrap often enters the waste stream and is frequently burned. Recycling this scrap can be difficult. For example, some upper designs may incorporate multiple types of materials. Not all of those materials may be recyclable, or one material may be recyclable for some purposes and another may only be recyclable for different purposes. Separating these different types material scraps for recycling might be labor intensive or otherwise impractical.

The above concerns are not limited to manufacturing of footwear. Many other types of goods can include manufacturing operations that generate scrap, which scrap may be difficult to recycle or otherwise dispose of in an environmentally-conscious manner. For commercial, environmental and other reasons, there remains a need for ways to reduce the amount of material scrap that enters the waste stream during production of shoes and/or other types of goods.

SUMMARY

This Summary is provided to introduce a selection of concepts in a simplified form that are further described below in the Detailed Description. This Summary is not intended to identify key or essential features of the invention.

In a process according to at least some embodiments, scraps are obtained from one or more other processes. Those processes can include, e.g., processes for fabricating an upper for a first shoe. Those scraps may then be reduced in size to obtain reduced-size scrap particles and/or panels. The reduced-size scrap can then be distributed to create one or more recovered material layers in an interim assembly of composite panel elements. That assembly may include panels cut or otherwise formed from other materials, or other elements may be absent. The recovered material layer (and additional elements, if present) can then be subjected to heat and/or pressure so as to create a pliable composite panel. In some embodiments, that pliable composite panel may be an upper shell or may be used to create an upper shell. In at least some such embodiments, the upper shell can be incorporated into an upper and the upper can be incorporated into the second shoe.

Other embodiments include numerous variations on the above process. For example, scraps may be obtained from the fabrication of articles other than footwear or footwear components. As but another example, a pliable composite panel produced from scrap (or a portion of such a pliable composite panel) may be used to create an article other than a footwear component.

Additional embodiments include products and/or intermediate products of processes according to other embodiments.

BRIEF DESCRIPTION OF THE DRAWINGS

Some embodiments are illustrated by way of example, and not by way of limitation, in the figures of the accompanying drawings and in which like reference numerals refer to similar elements.

FIG. 6 shows an upper shell after trimming.

FIG. 7 shows an upper that includes the trimmed upper shell of FIG. 6.

FIG. 8 shows a shoe that includes the upper of FIG. 7.

DETAILED DESCRIPTION

At least some embodiments include one or more processes in which an article (e.g., a component of a first shoe upper) is fabricated using scraps. Those scraps may be remnants from fabricating other articles (e.g., components of other shoes), and can be incorporated into one or more recovered material layers or other elements of a pliable composite panel. In some embodiments, the pliable composite panel (or a portion thereof) is used to create a shell of a footwear upper. That shell can then be trimmed, joined and/or otherwise processed to form the upper, which upper can then be incorporated into a completed shoe. Additional embodiments include articles (e.g., footwear and/or footwear components) made using one or more processes that utilize fabrication scrap. In still other embodiments, techniques such as are described herein can be used to fabricate articles other than footwear or footwear components and/or utilize scraps from sources other than footwear manufacturing.

Figure 1:
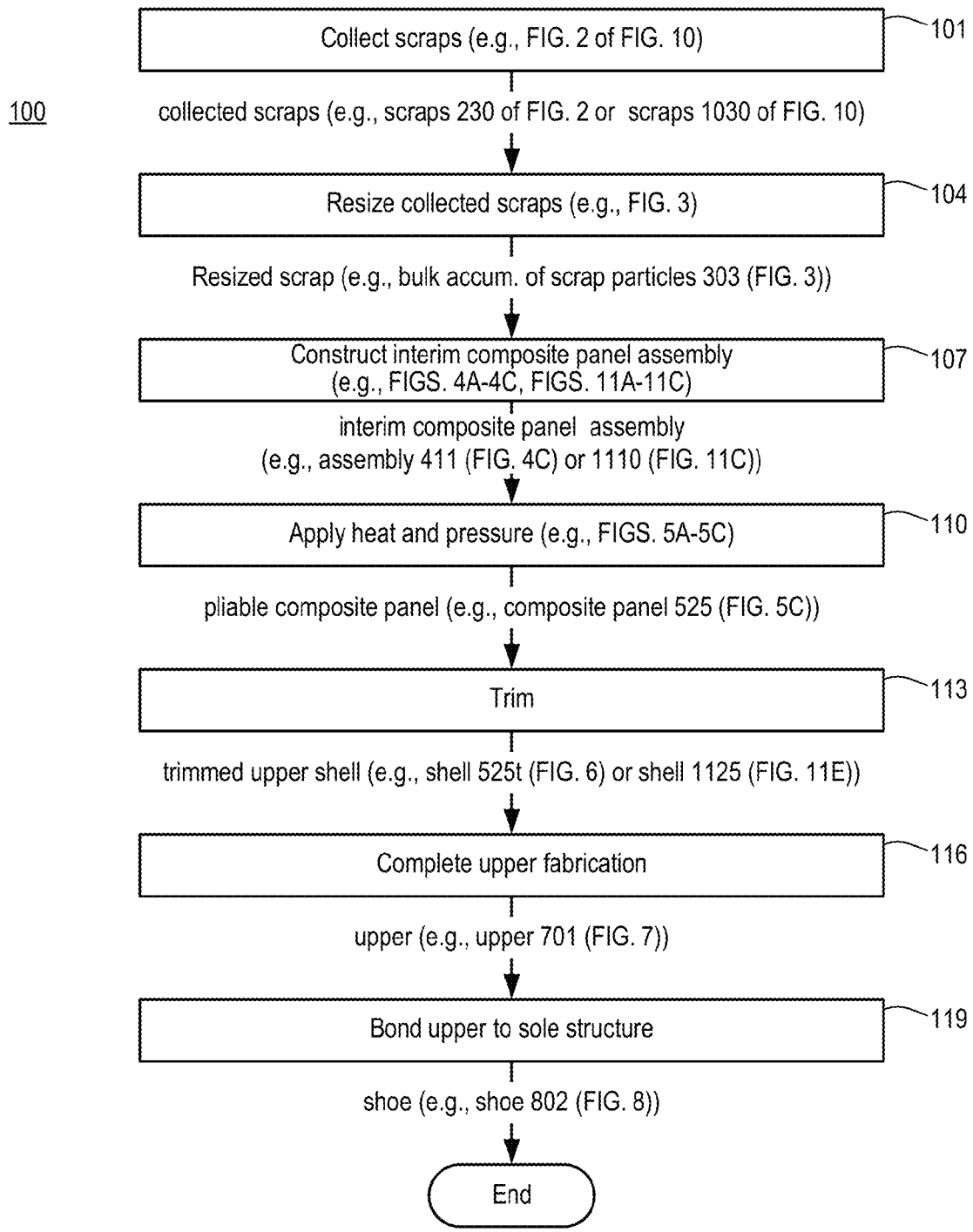
FIG. 1 is a flow chart showing operations in a process, according to some embodiments, for fabricating articles that include one or more recovered material elements.

FIG. 1 is a flow chart showing operations in a process, according to some embodiments, for fabricating articles that include one or more recovered material elements. In the embodiments of FIG. 1, an end result of process 100 is a shoe. Process 100 is only one example of a process that a manufacturer might perform in various embodiments. Additional embodiments include numerous variations on process 100, processes that include one or more steps of process 100 but in which an article other than footwear is produced, and processes in which scraps are received from sources other than footwear manufacturing. Some of these additional embodiments are discussed below.

FIG. 1 organizes process 100 into a series of steps, with each step represented as a different block. Arrows show progression between the steps and include superimposed labels that indicate intermediate products. Those labels also include references to drawing figures showing additional details of intermediate or final products.

Each step of process 100 may correspond to multiple individual physical operations. Some examples of such operations are described in connection with additional drawing figures cross-referenced by various FIG. 1 blocks. All operations need not be performed by a single manufacturer. For example, a first manufacturer could perform scrap collection operations, a second manufacturer could perform scrap resizing operations, and a third manufacturer could perform operations to incorporate resized scrap into footwear components. Some embodiments include variations of process 100 in which one or more steps are omitted, as well as products and/or interim products of such varied processes.

The manner by which discrete operations are divided into different steps in FIG. 1 is primarily for purposes of explanation. The classification of a particular operation as corresponding to a particular step could be varied. Process 100 could alternately be described as multiple processes.

To simplify explanation, process 100 is described as though it is being carried out to produce a single shoe. In practice, process 100 may be performed so as to produce numerous shoes. Some process 100 steps may output intermediate products that provide a source of material for fabricating multiple shoes. For example, and as discussed in connection with FIG. 3, the intermediate product at the conclusion of step 104 in some embodiments can be a bulk accumulation of scrap particles. That accumulation may then provide a source of scrap particles used to create multiple upper shells, with each of those shells becoming part of an upper in a separate shoe. Some steps may output a single intermediate product (e.g., a single shell or a single shell element assembly) that is ultimately incorporated into a single shoe. However, multiple instances of such steps could be performed in parallel so as to facilitate production of multiple shoes.

Process 100 begins in step 101 with the collection of material scraps. Those material scraps could be remnants from fabricating uppers for other types of shoes. For example, the collected material scraps might be remnants from operations to fabricate a first shoe. Continuing this example, the final output of process 100 may be a second shoe that is very different from the first shoe. The material scraps collected in step 101 could also (or alternatively) include remnants from operations to fabricate other shoes that are similar (or identical) to the shoe output from process 100. For example, scraps from operations in later steps of process 100 could be collected as part of collection operations in a separate iteration of process 100.

Figure 2:
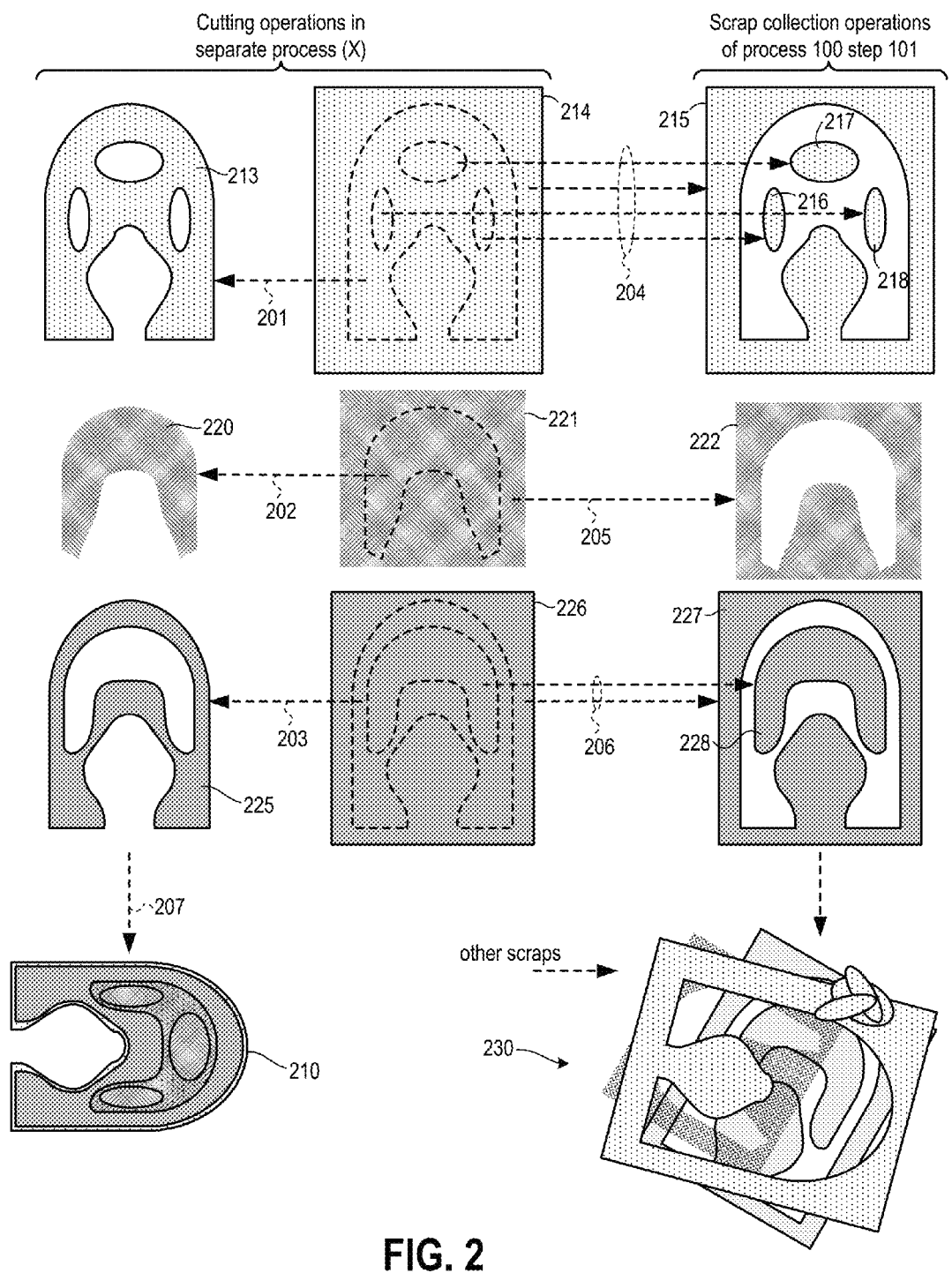
FIG. 2 shows collection of material scraps according to some embodiments.

FIG. 2 further illustrates step 101 operations in an embodiment of process 100 that collects material scraps from cutting operations of a separate process "X." Process X is different from process 100 and produces an upper shell 210. Shell 210 of process X is subsequently incorporated into a shoe having a design that is different from the design of the process 100 shoe. FIG. 2 shows three cutting operations 201-203 from process X. Those cutting operations are juxtaposed with collection operations 204-206 of step 101 from process 100. Process X could be performed by the manufacturer performing other steps of process 100, or could be performed by a different manufacturer.

Cutting operations 201 through 203 create elements that are incorporated into upper shell 210. In the example of FIG. 2, shell 210 includes a bonded mesh composite panel formed from panels of different materials. Shell 210 may be a shell as described in (and as produced by one or more processes described in) commonly-owned U.S. patent application Ser. Nos. 12/603,494 and 12/603,498, each of which is titled "Composite Shoe Upper and Method of Making Same" and was filed Oct. 21, 2009, and each of which is incorporated by reference herein in its entirety.

In a first cutting operation 201, a substrate panel 213 is cut from a larger stock sheet 214 of substrate material. This cutting operation leaves scraps 215-218 of sheet 214. Scraps 215-218, together with scraps from cutting other elements similar to panel 213, are collected in operation 204. Sheet 214 (and thus, scraps 215-218) could be any of various types of materials. In some embodiments, substrate material is (or includes) a synthetic leather or similar material. Table 1 provides a non-exclusive list of examples of possible substrate materials.

TABLE 1

| Material Type/Description | Example Commercially-Available Product |
| --- | --- |
| EPM synthetic suede 0.5-1.0 mm thick | CLARINO TIRRENINA NUBUCK (Kuraray America, Inc., New York, NY) |
| regular density synthetic leather | SOFT-R 1.1 mm (Nan Ya Plastics Corporation, Taiwan) |
| microfiber synthetic leather | THUNDER II, 1.4 mm (Nan Ya Plastics Corporation, Taiwan) |
| EPM synthetic leather with 50% rePET in high density substrate | KANGA ENV 1.3 mm or 1.5 mm (Nan Ya Plastics Corporation, Taiwan) |
| buffed high density synthetic leather | KITE BUFF 0.9 mm (Daewoo International Corporation, Pusan, Korea) |
| poly/nylon nonwoven | EVO80 WS (Freudenberg & Co., Weinheim, Germany) |
| perfed microfiber polyester textile | LJ-M11K (Gold Long John International Co, Taiwan) |
| polyester textile package | POLYPAG PLUS MULTI (You Young Co., Ltd., Korea) |
| polyester textile package | JEKYLL PLUS MULTI (You Young Co., Ltd., Korea) |
| TPU coated synthetic leather | A806/A807 (Chaei Hsin Enterprise Co., Ltd., Taiwan) |

In a second cutting operation 202, a mesh panel 220 is cut from a larger stock sheet 221 of mesh material. As a result, a scrap 222 of mesh sheet 221 remains. Scrap 222, as well as other scraps from cutting additional elements similar to panel 220, are collected in operation 205. Sheet 221 could be any of various types of material. In some embodiments, mesh material is (or includes) a single layer warped knit with an open structure (or other type of woven material) and is formed from nylon, polyester, nylon/polyester blends, recycled polyethylene terephthalate (rePET), or other material. A non-exclusive listing of examples of possible mesh materials is included as Table 2.

TABLE 2

| Material Type/Description | Example Commercially-Available Product |
|---|---|
| 100% PET mesh | E-minicell mesh 420D single mesh (Daewoo International Corporation, Pusan, Korea) |
| | BULLHEAD mesh (Formosa Ting Sho Co., Ltd., Taiwan) |
| 35% rePET mesh | TENOR mesh (Joonang Textile Co., Ltd., Korea) |
| 38.6% rePET mesh | AIR TING mesh (Mogae Textile Co., Ltd., Busan, Korea) |
| 34% nylon 200D/84F, 66% polyester 300D/168F | TLE8B001 DUONET (Tiong Liong Industrial Co., Ltd., Taiwan) |
| 32% polyester 100D/36F, 68% polyester 300D/168F | TLD9B018 BLOCKBUSTER (Tiong Liong Industrial Co., Ltd., Taiwan) |
| 50% rePET mesh | MATRIX mesh (You Young Co., Ltd., Korea) |
| 30% rePET mesh | MONO RIB mesh (Dong Jin International Corporation, DaeGu, Korea) |
| 30% rePET mesh | thermoplastic mesh 6 (Duck San Co., Korea) |
| 30% rePET mesh | Egg mesh (You Young Co., Ltd., Korea) |
| Love Look | Formosa Ting Sho Co., Ltd., Taiwan |

In a third cutting operation 203, a skin panel 225 is cut from a larger stock sheet 226 of skin material, resulting in scraps 227 and 228. Scraps 227 and 228, together with scraps from cutting other elements similar to panel 225, are collected in operation 206. Sheet 226 could be any of various types of material. In some embodiments, skin material is (or includes) a thermoplastic polyurethane (TPU) or a multilayer material having an outer heat-resistant layer for abrasion resistance and an inner layer for hot melt bonding (e.g., an outer layer of thermoset polyurethane (PU) or high melt temperature TPU, an inner layer of lower melt temperature TPU). Table 3 is a non-exclusive listing of examples of possible skin materials.

TABLE 3

| Material Type/Description | Example Commercially-Available Product |
|---|---|
| 0.4 mm thermoset polyurethane (PU) film | UT900 (San Fang Chemical Industry Co., Ltd., Taiwan) |
| TPU film | FW film (Daewon Chemical Company, Ltd., Korea) |
| Dual (H/L) TPU film having 0.1 mm high melting temp. aliphatic film layer and 0.2 mm low melting temp. aromatic polyester film FS8080 layer | FD26K series (Ding Zing Chemical Products Co., Ltd., Taiwan) |
| 0.3 mm film having 0.1 mm PU layer and 0.2 mm TPU hot melt layer | SKN300 (Teijin, Okahata, Japan) |
| 0.35 mm PU coated hot melt film | HH Million AB (Daewoo International, Busan, Korea) |

Elements 213, 220 and 225 may then be assembled and further processed (operations 207) to create shell 210. Those additional operations can include pressing, heat application, etc. As part of those or other operations, shell 210 might be trimmed. For example, a portion of shell 210 might be removed to create a tongue opening. Trimmings from such other operations, which may include bonded pieces of the materials from which elements were cut in operations 201-203, may also be collected as scrap in step 101 of process 100.

For simplicity and purposes of explanation, FIG. 2 shows a separate process 100 step 101 collection operation associated with each process X cutting operation. Scraps can be collected in any convenient manner, however. For example, a manufacturer performing process X might repeatedly perform numerous iterations of cutting operations 201-203, as well as similar operations in connection with other processes to fabricate other upper shells, so as to pre-cut elements for later assembly and/or for assembly at a different location. During those pre-cutting operations, workers may simply toss scraps onto the floor. The floor could then be swept periodically to collect scraps as part of another operation of scrap collection step 101 in process 100. As another possibility, cutting operations 201-203 of process X could be performed at work stations that are closely located relative to one another. A large bin or other receptacle could be placed near those work stations, and workers performing the cutting operations could throw scraps into that bin. In such a case, step 101 could include retrieval of scraps from that bin.

FIG. 2 only shows collection of scraps that remain from fabricating one type of upper shell. In some embodiments, step 101 of process 100 could involve collecting scraps from the fabrication of multiple different types of upper shells. Some of those different upper shells might include elements cut from materials not used in others of those shells.

Collected scraps 215-218, 222, 227 and 228 are combined with other scraps (e.g., scraps collected in operations similar to operations 204-206). As a result, collected scraps 230 become an intermediate product of step 101 (FIG. 1). In step 104, collected scraps 230 are resized in one or more operations that reduce those scraps into smaller-sized pieces. In some embodiments, and as discussed below in connection with FIGS. 10-11C, resizing can result in scrap panels that are still relatively large in size. In some other embodiments, resizing can include comminuting, grinding, chopping and/or other operations that reduce scraps to relatively small particles. This is further illustrated in FIG. 3, where collected scraps 230 are placed into a hopper 301 of a textile waste shredding machine 300. Particles 302 of reduced-size scrap pieces are then output from shredding machine 300.

For embodiments in which scraps are resized to obtain relatively small particles, any of various types of commercially-available textile waste shredding machines that are configurable to sufficiently reduce scrap size to a desired level can be used for the operations of step 104. Such machines may utilize multiple blades or other physical cutting components to reduce scraps by cutting, grinding, shredding, chopping, and/or other mechanisms. Other types of cutting mechanisms (e.g., high pressure water jetting) could also be used, although some additional processing (e.g., drying of scraps cut with water jets) might be needed in connection with some alternate cutting techniques.

In some embodiments, coarsely ground particles 302 output from shredding machine 300 or other size-reducing device may be several millimeters in size and appear as flakes of the original material from which the scrap was obtained. For example, a typical coarsely ground particle of synthetic leather or TPU may have an area of approximately 10 square millimeters ($mm^2$) to 100 $mm^2$ (or in some embodiments, as large as 200 $mm^2$ to 250 $mm^2$) and be recognizable as a very small, flake-like piece of a much larger sheet of synthetic leather or TPU. When a layer of such particles is incorporated into a pliable composite panel (e.g., as discussed below in connection with FIGS. 4B-8), that layer may have a heterogeneous appearance in which particles of different scrap materials are recognizable. In other embodiments, scrap particles may be much smaller. For example, scraps may be finely ground to a form that might resemble a powder. When a layer of such finely ground particles is incorporated into a pliable composite panel, that layer may have a more homogeneous color and texture, and individual scrap particles may be less recognizable (or even unrecognizable).

As part of resizing step 104 in some embodiments, scrap particles may be passed through a screen or other filter to remove larger particles that were not sufficiently reduced in size. Some embodiments may utilize a shredding machine 300 that includes such a screen between the shredding blades and the device output 304. The screen may be replaceable with a different type of screen if larger or smaller particles are desired. In other embodiments, the output from a shredding machine may be separately passed through a screen to catch oversized particles. Oversized particles can then be re-input to hopper 301 for further size reduction.

Figure 3:
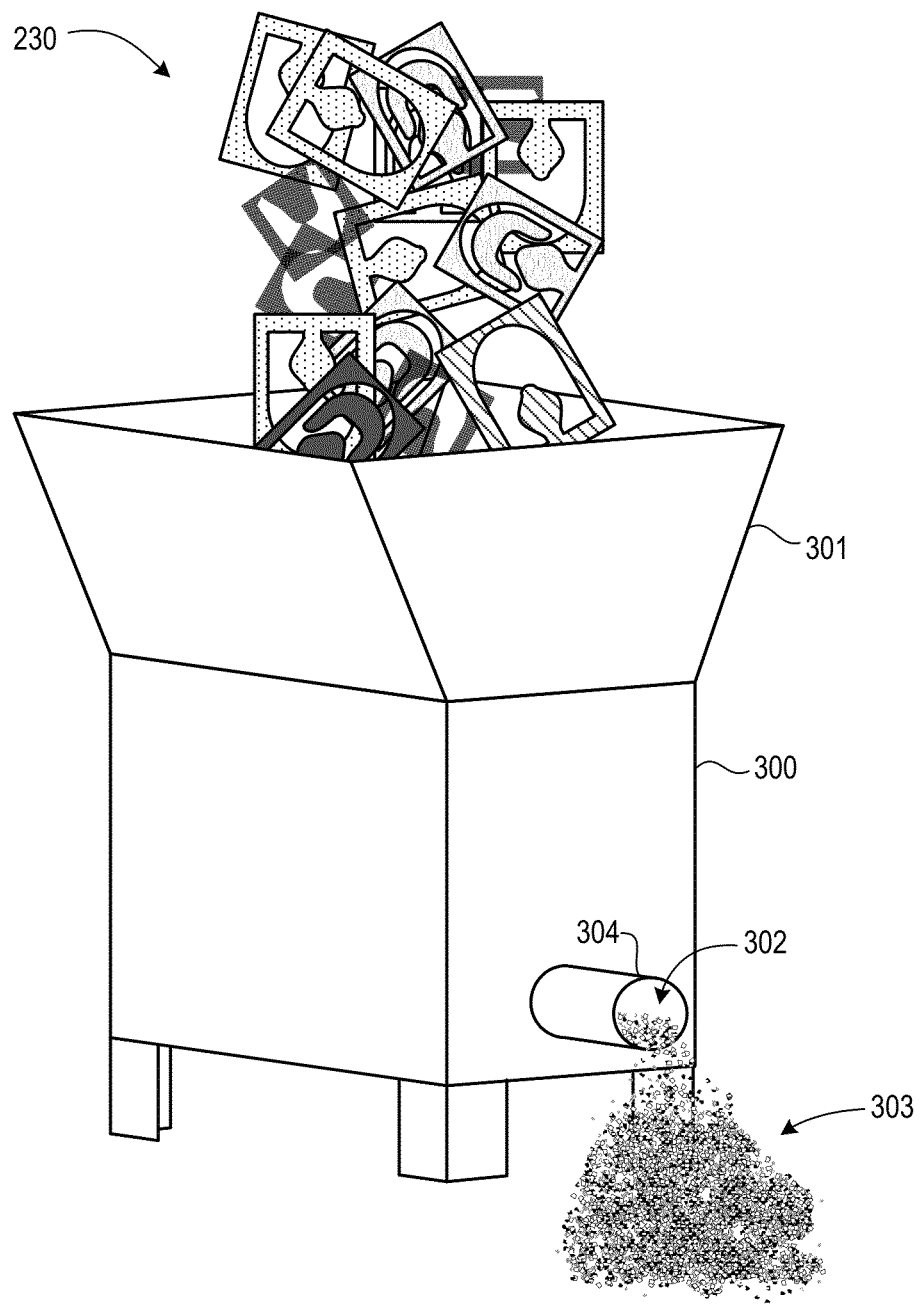
FIG. 3 shows resizing scraps and an accumulation of scrap particles according to some embodiments.

The intermediate product at the end of step 104 is resized scrap material. In some embodiments, and as discussed below in connection with FIGS. 10 through 11C, the resized scrap material intermediate product from step 104 may include one or more panels of scrap material. In the embodiment of FIG. 3, however, resizing is performed to obtain relatively small scrap particles, and the intermediate product of step 104 is a bulk accumulation 303 of scrap particles 302. In the embodiments of FIGS. 3-8, accumulation 303 may provide a source of scrap particles for fabricating multiple upper shells. For each of those shells, a portion of accumulation 303 may be removed in an iteration of step 107 (FIG. 1) and placed into position to form a recovered material layer in an interim composite panel assembly. In some embodiments, and as described below, an interim composite panel assembly may include one or more additional elements that are also positioned in step 107.

Figure 4A:
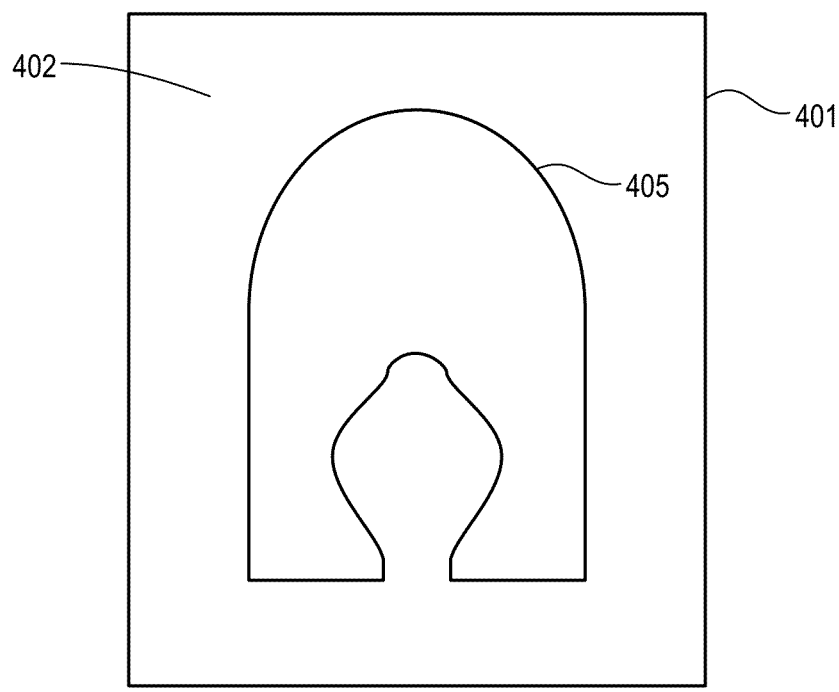
FIGS. 4A through 4C show construction of elements to create an interim composite panel assembly.
Figure 4B:
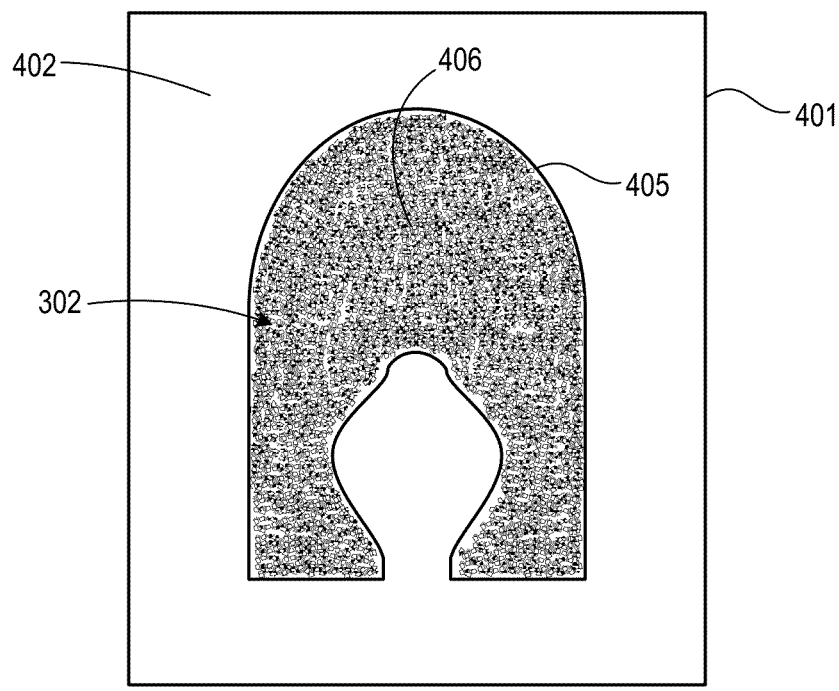
Figure 4C:
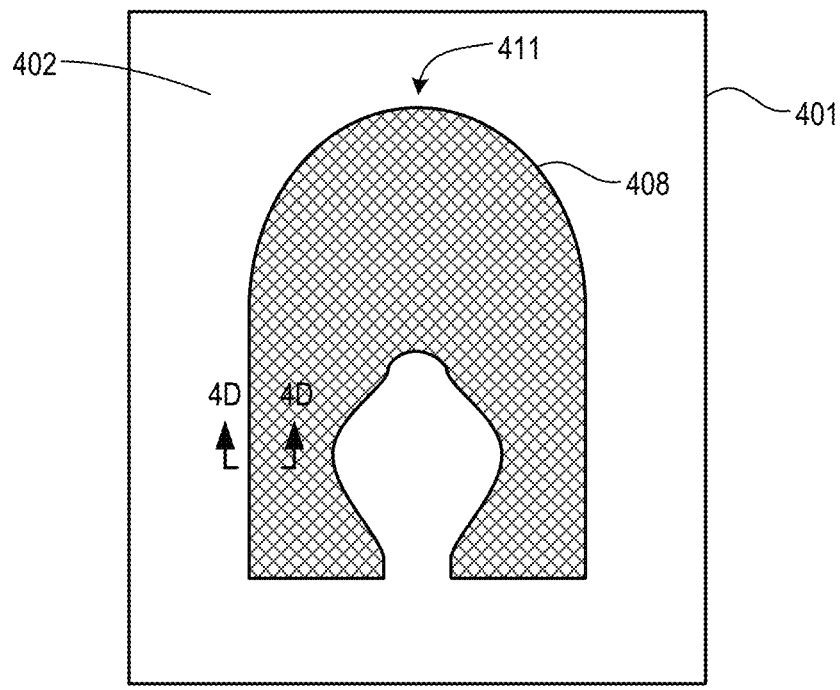

FIGS. 4A through 4C show operations of step 107 in an embodiment that utilizes scrap particles 302 from accumulation 303. FIG. 4A shows a lower plate 401 that will, with a corresponding upper plate 501 (described below in connection with FIG. 5A), transfer heat and pressure to an interim composite panel assembly ("assembly") of material elements during a subsequent step of process 100. Plate 401 may also serve as a surface upon which various elements are positioned while constructing the assembly. In other embodiments, elements may be placed into an assembly and the assembly then transferred to plate 401.

Working surface 402 of plate 401 may be generally smooth. Plate 401 can be formed from aluminum, steel or other heat-conductive material. Plate 401 may also include internal heating elements and/or channels for the flow of a cooling fluid. Plate 401 may be mounted onto a press, or plate 401 may be configured for placement between heated platens of a separate press machine.

As further shown in FIG. 4A, an inner panel 405 is placed onto surface 402. A sheet of silicone-coated release paper or other release agent could be interposed between panel 405 and surface 402 to facilitate removal of a pliable composite panel at the conclusion of pressing operations. For simplicity, release paper or other release agent is not shown between panel 405 and surface 402, or between other panels and plate surfaces discussed below.

In the embodiment shown, panel 405 will ultimately form an inner layer of an upper shell, and will also serve as an inner carrier for a recovered material layer formed from particles 302. When the upper shell comprising panel 405 is incorporated into the upper of a completed shoe, panel 405 will be located on the face of the shell oriented toward the shoe interior. Panel 405 has a shape that generally corresponds to a flattened upper shell, although certain portions of panel 405 may be trimmed in a later fabrication step. Panel 405 can be formed from PU or any of various other materials. In some embodiments, for example, panel 405 could be formed from TPU, from synthetic leather, from a synthetic mesh material, from other woven or nonwoven synthetic materials, from various other types of textile materials, etc. Panel 405 could itself be formed from recycled scraps.

In at least some embodiments, panel 405 has a melting temperature that is higher than a melting temperature of TPU particles to be located within a recovered material layer above panel 405. A recovered material layer, as described below, may include a portion of scrap particles 302. In some cases, TPU particles in a recovered material layer may be scrap particles collected from fabrication of uppers that include one or more TPU elements. For example, scrap particles 302 (FIG. 3) include TPU particles that result from TPU scraps such as scraps 227 and 228 (FIG. 2). In other cases, collected scraps may have insufficient TPU content to achieve a desired bonding in a shell or other article being produced. For example, scraps may have been collected from cutting operations associated with fabricating an upper having little or no TPU content. In such cases, additional TPU powder or pellets can be mixed with the scrap particles before those particles are used to create a recovered material layer. As another alternative, a layer of TPU sheet can be placed adjacent to a recovered material layer formed from TPU-deficient scrap particles. As another alternative, panel 405 could include a layer of TPU or other heat-activated bonding agent on the face that will contact the recovered material layer.

In the operation shown in FIG. 4B, a portion of scrap particles 302 removed from accumulation 303 (FIG. 3) is placed onto panel 405. Those particles are then distributed over most of the exposed surface of panel 405 so as to form an unbonded recovered material layer 406. Layer 406 may be relatively thin. In at least some embodiments, however, the recovered material layer is sufficiently thick so that substantially none of the upper surface of panel 405 facing layer 406 is exposed. In some embodiments, the thickness of the recovered material layer is determined by selecting a thickness that will, in combination with panel 405 and other layers, result in a thickness appropriate for an upper of the type of shoe being fabricated. In some embodiments, particles of a recovered material layer may not be distributed over most of the exposed surface of panel 405 (or other panel) or may otherwise only occupy a smaller portion of a composite panel having a recovered material layer.

In a further operation shown in FIG. 4C, an outer panel 408 is placed over recovered material layer 406. In the embodiment shown, outer panel 408 will ultimately form an outer layer of an upper shell, and will also serve as an outer carrier for the recovered material layer. When that upper shell is incorporated into the upper of a completed shoe, outer panel 408 will be located on a face of the shell oriented away from the shoe interior. Like inner panel 405, outer panel 408 may have a shape that generally corresponds to a flattened shell, although certain portions of outer panel 408 may be trimmed in a later production step. Outer panel 408 can be formed from PU, and in at least some embodiments is formed from a PU or other material having a higher melting temperature than that of TPU within or adjacent to recovered material layer 406. As with inner panel 405, outer panel 408 could alternately be formed from various other materials (e.g., TPU, synthetic leather, a synthetic mesh material, another woven or non-woven synthetic material, another type of textile material, a material that is itself formed from recycled scraps, etc.) and/ or include a layer of TPU or other heat-activated bonding agent on the face that will contact the recovered material layer. In some embodiments, and as seen in FIG. 4C, outer panel 408 may be cut from a sheet of PU or other plastic material having a mesh material embedded in the sheet. That mesh may provide structural reinforcement and/or be included for aesthetic reasons.

Figure 4D:
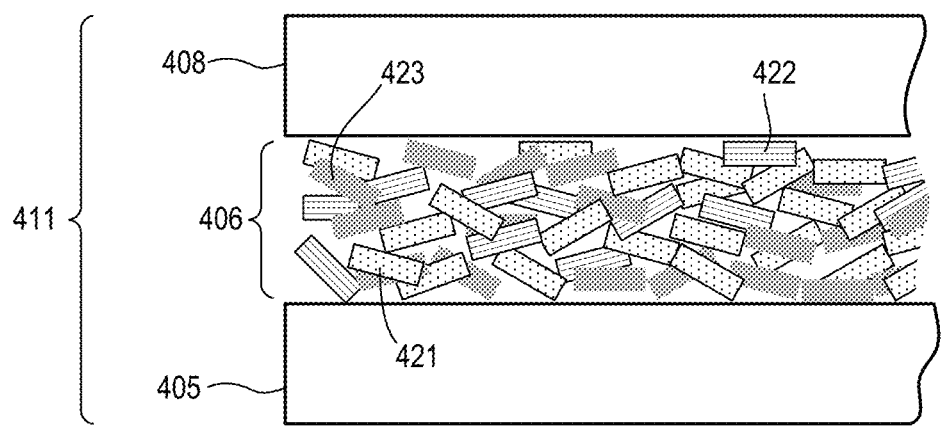
FIG. 4D is an enlarged, partially schematic cross-sectional view from the location shown in FIG. 4C.

In the embodiment shown in FIGS. 4A-4C, and as seen in FIG. 4C, a shell element assembly 411 is formed after outer panel 408 is placed into position over recovered material layer 406. In the current example, that assembly includes panel 405, particles 302 within layer 406, and panel 408. At the stage shown in FIG. 4C, assembly 411 is unbonded. FIG. 4D is an enlarged, partially schematic cross-sectional view of (unbonded) assembly 411 from the location indicated in FIG. 4C. FIG. 4D assumes that recovered material layer 406 only includes synthetic leather scrap particles 421 (stippled boxes), mesh material scrap particles 422 (line cross hatched boxes) and TPU scrap particles 423 (solid gray boxes). For simplicity, FIG. 4D represents individual scrap particles as uniformly sized rectangular boxes. Scrap particles in an actual recovered material layer may be of varying sizes and shapes. As seen in FIG. 4D, the individual TPU scrap particles 423 of recovered material layer 406 have not yet bonded to other scrap particles in layer 406 or to either of panels 405 and 408.

In other embodiments, and as discussed in more detail below, an interim composite panel assembly may include additional panels and/or a different arrangement of panels. In such embodiments, an unbonded assembly may be formed when other and/or different elements have been put into place.

Figure 5A:
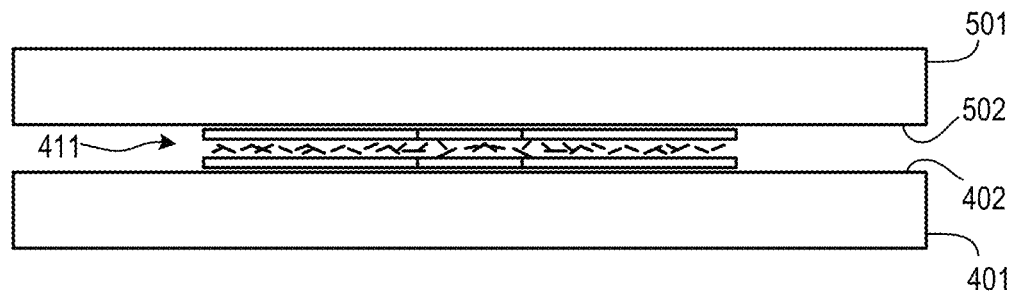
FIGS. 5A and 5B show operations in connection with a heating and compression step of the process from FIG. 1.

Returning to FIG. 1, assembly 411 is an intermediate product of step 107 in the embodiment of FIGS. 4A through 4D. In step 110, heat and pressure are applied to assembly 411 so as to create a pliable composite panel in the shape of an upper shell. In a first operation of step 110, and as shown in FIG. 5A, an upper plate 501 is placed over lower plate 401 and assembly 411. Plate 501 may be similar in construction to plate 401. A sheet of release paper or other release agent could be interposed between panel 408 and surface 502 to facilitate removal of the composite panel at the conclusion of pressing operations. Plates 401 and 501, with assembly 411 located between them, can then be placed between heated press platens.

In some embodiments, the face 502 of upper plate 501 that contacts an assembly is also smooth. In other embodiments, a pattern may be formed in face 502 of upper plate 501 and/or in face 402 of lower plate 401. When an assembly is pressed between upper plate 501 and lower plate 401 and heat is applied, the pattern(s) of contact face 402 and/or of contact face 502 is(are) pressed into layer(s) of the assembly. This pattern may be aesthetic and/or functional. For example, raised and/or depressed regions of the pattern pressed into the shell assembly elements could be used to locate other elements of the upper and/or used to help position the shell or other shoe components during subsequent fabrication operations. As another example, and as discussed below in connection with FIG. 9, surfaces of plates similar to plates 401 and/or 501 can include a grid-like pattern of blades that pinch certain portions of an assembly during heating so as to create a quilting effect in a formed composite panel.

Figure 5B:
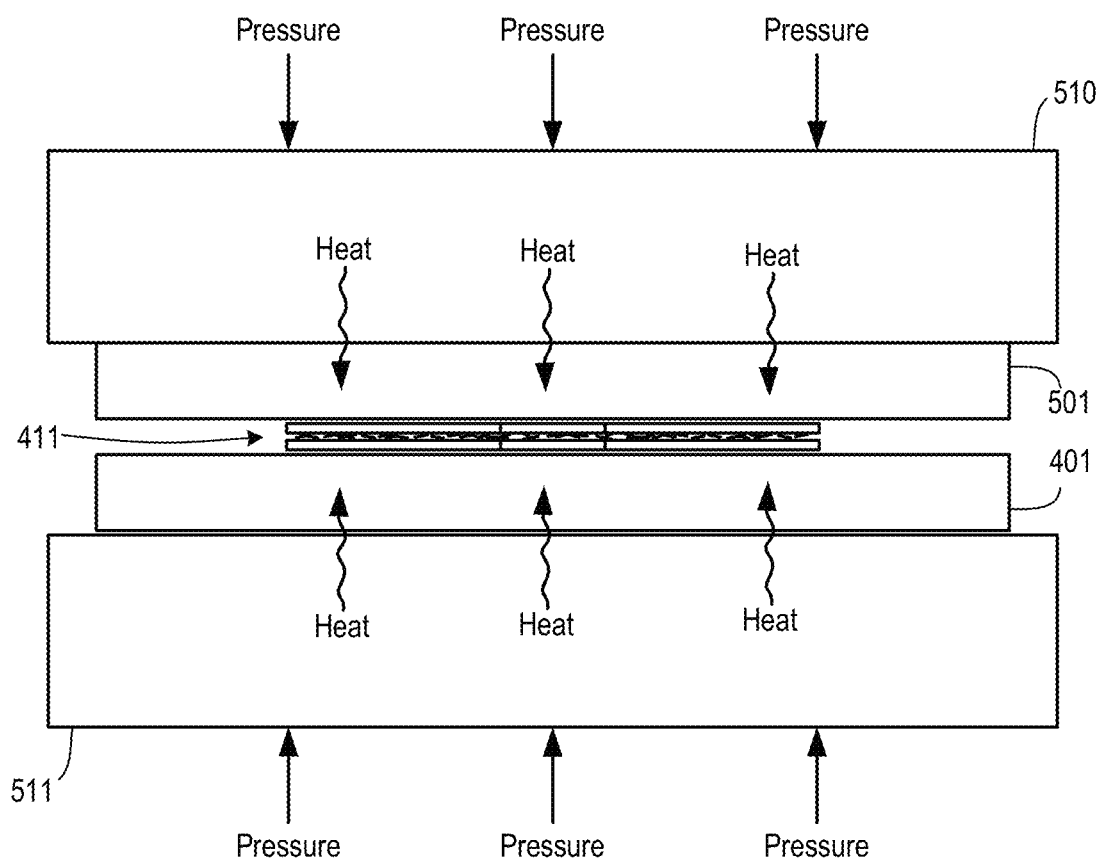

In a subsequent operation of step 110, and as shown in FIG. 5B, plates 401 and 501 and assembly 411 are placed between heated platens 510 and 511 of a press. Platens 510 and 511 press together, thereby transferring heat and pressure to assembly 411 via plates 401 and 501. As a result, TPU within recovered material layer 406 melts. The melted TPU bonds to other scrap particles in recovered material layer 406 and to elements adjacent to the recovered material layer (panels 405 and 408 in the embodiment shown).

In one embodiment in which lower panel 405 and upper panel 408 are formed from PU, and in which the recovered material layer includes coarsely ground scraps that contain TPU skin material, synthetic leather, and synthetic mesh material, an interim composite panel assembly was placed between press plates heated to 145° C. for 60 seconds. The heating temperature, applied pressure and press time for the operation shown in FIG. 5B will vary based on the content of the scrap particles (or other scrap elements) in the recovered material layer, based on the other materials in the assembly, and based on other design features of the assembly. For example, and as described below, shells in some embodiments may include additional elements and/or elements arranged in a different manner. The proper combination of press temperature, pressure and press time applicable to a particular combination of recovered material elements and/or other elements (e.g., carrier layers, if present) can be determined in various ways. In some embodiments, for example, a test assembly is created for a particular design. Thermocouple temperature probes are then inserted at one or more locations within the recovered material layer and/or other layers of the test assembly. The test assembly is then pressed between 120° C. press platens until the temperature probes indicate that the internal assembly temperature has reached a desired melting point for TPU in and/or adjacent to the recovered material layer. If desired, the press time can be adjusted upward or downward by adjusting the press platen temperature. The desired melting point temperature for a particular TPU can be determined by using differential scanning calorimetry (50° C./min. scan rate) to find the temperature associated with the maximum heat transfer for that TPU material. Press pressure can be adjusted upward if there is insufficient bonding between layers in one or more test assemblies or adjusted downward if there is excessive (and undesired) "flattening" of surface features.

In some embodiments, step 110 of process 100 further includes one or more cooling operations. In particular, after application of heat and pressure to plates 401 and 501, the plates are allowed to cool while pressure on the heated and compressed assembly is maintained. In this manner, the melted TPU components within the assembly cure and the elements of the assembly are thoroughly bonded. Such cooling while under pressure may also help to prevent rebound expansion of certain components within the recovered material layer. This cooling operation can be performed in various manners in different embodiments. In some embodiments, plates 401 and 501 may be clamped together while they are being subjected to heat and pressure between platens 510 and 511. The clamped plates can then be removed from platens 510 and 511 and allowed to cool before unclamping.

Figure 5C:
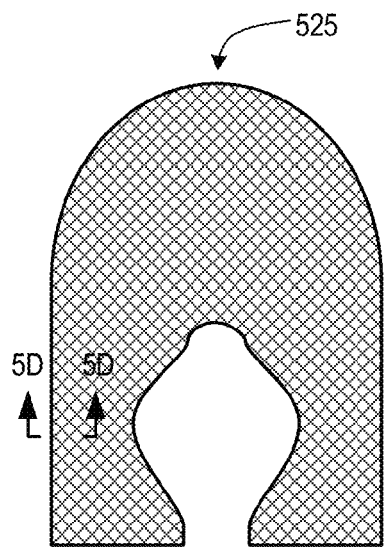
FIG. 5C shows a pliable composite panel according to some embodiments.
Figure 5D:
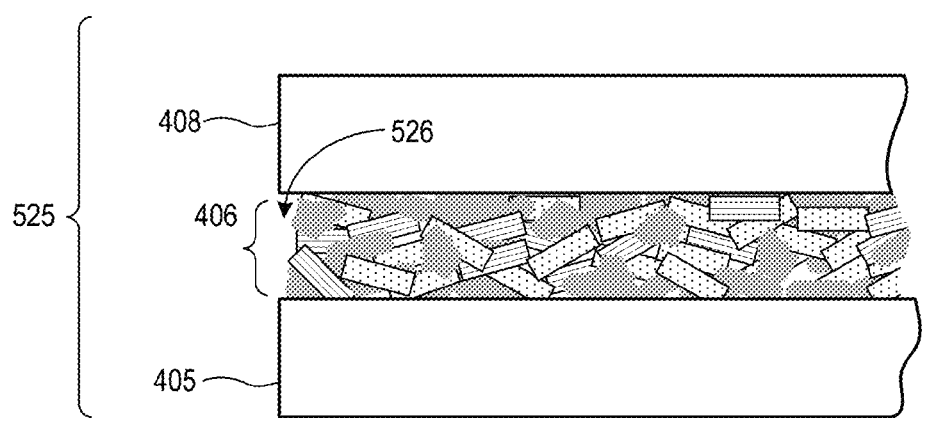
FIG. 5D is an enlarged, partially schematic cross-sectional view from the location shown in FIG. 5C.

In a subsequent operation of step 110, and as shown in FIG. 5C, plates 401 and 501 are separated and a pliable composite panel 525 is removed. In the embodiment of FIG. 5C, panel 525 is in the shape of a flattened upper shell. FIG. 5D is an enlarged, partially schematic cross-sectional view of composite panel 525 taken from the location shown in FIG. 5C. As a result of the heat and pressure applied in step 110, and the subsequent curing during cooling of plates 401 and 501 before unclamping, TPU elements in scrap 302 particles of recovered material layer 406 have melted. The melted TPU has fused to other scrap particles and to surfaces of inner panel 405 and outer panel 408.

In the embodiment of FIGS. 5C and 5D, composite panel 525 and shell element assembly 411 each consists of the same underlying elements. The only difference between composite panel 525 and assembly 411 is the bonded nature of the elements resulting from fusing of TPU particles. In other embodiments, a composite panel may include additional elements. For example, one or more other elements (e.g., additional PU panels, padding, one or more synthetic leather panels) could be attached to a pliable composite panel after removal from plates 401 and 501. In still other embodiments, an assembly may include one or more elements that have undergone some degree of preliminary bonding. For example, scrap particles may be partially heated to make them sticky prior to placement in an assembly. As another example, and as discussed below, "felting" or other processes could be used to join scrap particles prior to placement in an assembly.

In step 113 (FIG. 1), composite panel 525 undergoes trimming operations and becomes trimmed shell 525t. For example, and as shown in FIG. 6, trimming operations are performed to create a tongue opening 602 and eyelet holes 603. Peripheral edges 601, 611, 612, 613 and 610, as well as ankle opening edges 614 and 615, may also be trimmed. Such edge trimming may be performed for multiple reasons. For example, and as seen in FIG. 5D, a small region 526 between the edges of panels 408 and 405 may not be bonded to layer 406. Peripheral edge trimming may allow creation of a clean edge where the layer 406 bonding extends to the edge of panels 405 and 408. One or more edges may also be trimmed to adjust the size of shell 525t and/or to otherwise prepare shell 525t for further fabrication steps. Portions of shell 525t that are removed during trimming operations can be collected as scraps and, e.g., added to other scraps collected during performance of step 101 for future process 100 iterations.

Returning to FIG. 1, shell 525t is incorporated into an upper in step 116. In particular, Shell 525t is converted from the flat form shown in FIG. 6 to a wrapped form that more closely resembles the upper shape. In particular, edges 601 and 610 are stitched, glued or otherwise joined. As a result, edges 614 and 615 become the medial and lateral sides of an ankle opening, and shell 525t takes a shape that will wrap around a wearer's foot in a completed shoe. Wrapped shell 525t then undergoes further operations and is incorporated into a completed upper 701 (FIG. 7). For example, shell 525t may undergo heat treatment to further shape the toe and other regions. Various elements may also be attached to shell 525t. As further examples, a tongue may be attached to shell 525t in the region of tongue opening 602, a liner may be attached to the interior of wrapped shell 525t so as to form a "bootie" or other type of liner element, a collar might be added around edges 614 and 615 of the ankle opening, etc. A lasting sock (or "Strobel") may also be attached to the lower edges of wrapped shell 525t.

Returning to FIG. 1, upper 701 is the intermediate product of step 116. In step 119, and as further shown in FIG. 8, upper 701 is bonded to a sole assembly 801. Sole assembly 801 may be a single monolithic element formed from a single material or it may have multiple separate components (e.g., a midsole, an outsole, a support plate, cushioning pad(s), cleats or other traction elements, etc.). Step 119 may also include additional finishing operations (e.g., insertion of a sock liner), resulting in a completed shoe 802.

As indicated above, process 100 merely represents one embodiment of a process according to the invention. Similarly, shoe 802 and components thereof merely represent some embodiments of products producible through process 100 or through processes according to other embodiments.

Some embodiments include processes (and products and/or intermediate products of such processes) in which one or more carriers (or portions of carriers) are omitted and a recovered material layer is exposed on the inner and/or outer face of a pliable composite panel. For example, panel 408 could be omitted from the operation shown in FIG. 4C. A sheet of release paper could be placed over layer 406 prior to placing upper plate 502 on the assembly. After pressing, the release paper could be removed and discarded, leaving recovered material layer 406 exposed on the outer surface of the resulting pliable composite panel. Panel 405 could also be omitted in a similar manner by replacing panel 405 with a sheet of release paper. Indeed, both of panels 405 and 408 could be replaced with release paper that is discarded after the pressing operations, resulting in a composite panel formed entirely from a layer of recovered scrap material.

Some embodiments may include multiple recovered material layers and/or recovered material layers that are wholly or partially offset from one another. Still other embodiments may include a pliable composite panel in which only a portion of the composite panel contains a recovered material layer. For example, some embodiments include shells (and shell fabrication techniques) in which a recovered material layer is only formed in regions of the shell that will become a heel counter and/or in regions that will cover the toes in the completed upper.

Some embodiments include processes (and products of such processes) in which a shoe has a design that is very different from that of shoe 802. For example, such processes could produce a shoe (or components for a shoe) that covers the wearer ankles. As another example, a shell produced in some embodiments could include a separate component (e.g., a foxing panel cut from a separate sheet) that is attached to a component formed from operations such as are shown in FIGS. 4A-5B.

Figure 9:
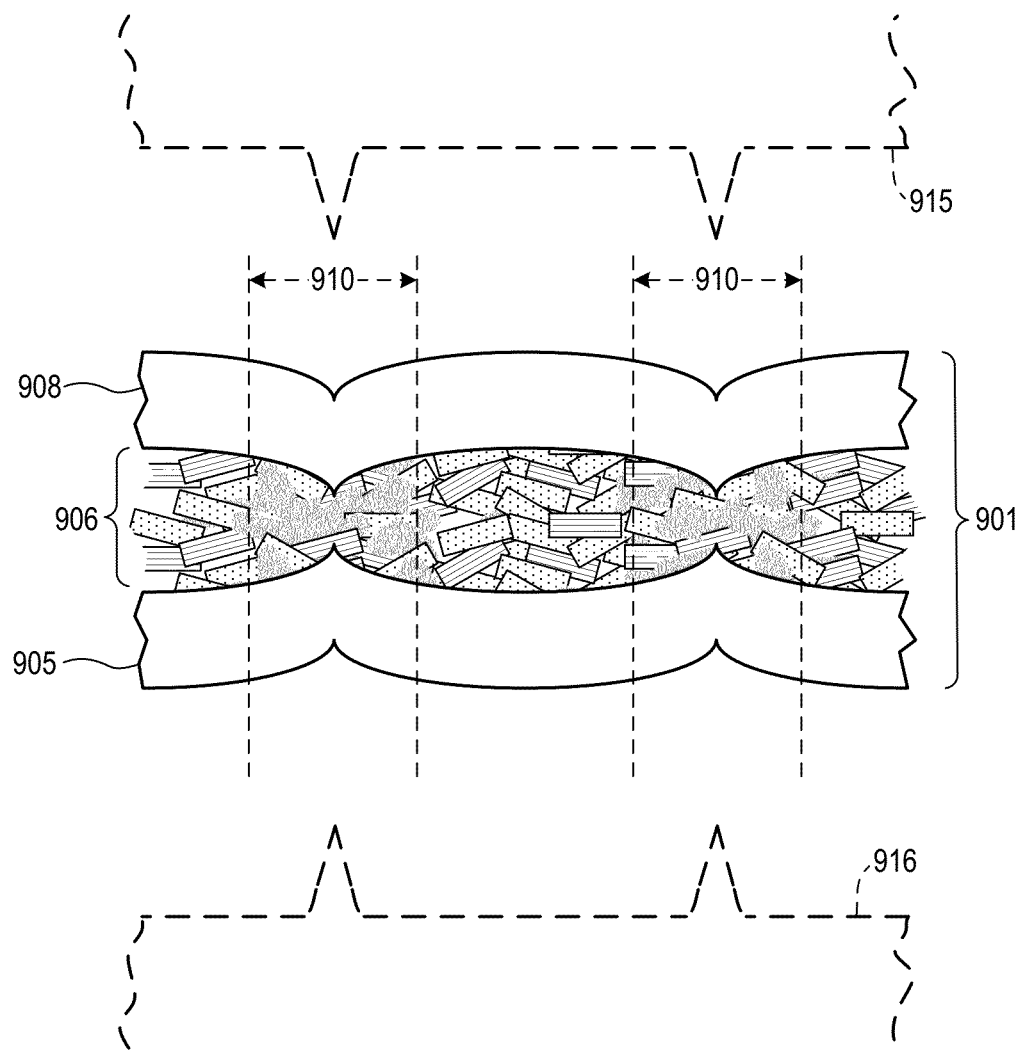
FIG. 9 is an enlarged, partially schematic cross-sectional view of a portion of a pliable composite panel according to another embodiment.

In some embodiments, "quilting" may be used to only fuse selected portions of the recovered material layer in a pliable composite panel. In particular, surfaces similar to surfaces 402 and 502 of upper and lower plates 401 and 501 could be modified to include patterns of blades that pinch and heat an assembly along grid lines. FIG. 9 is an enlarged, partially schematic area cross-sectional view of a portion of a composite panel 901 that could be formed from such quilting. Also shown in FIG. 9, in broken lines, are partial area cross-sectional views of an upper plate 915 and a lower plate 916 used to form composite panel 901. An interim assembly of elements for composite panel 901 can be placed between plates 915 and 916, and the plates then placed between heated press platens, to perform heating and pressing operations similar to those described above.

The result of heating and pressing between plates 915 and 916 is a composite panel 901 in which a recovered material layer 906 between an upper panel 908 and a lower panel 905 is more completed fused in pinched regions 910. The portions of layer 906 between pinched regions 910 is less completely fused. This allows composite panel 901 to be more flexible and to provide a more cushioned feel.

In some embodiments, quilting may be achieved using plates having configurations different from those shown in FIG. 9. For example, one of plates 915 and 916 could be replaced with a plate that is flat, or with a plate that has female depressions corresponding to male extensions of the other of plates 915 and 916.

In various embodiments described above, a pliable composite panel component in the shape of an upper shell is formed at the conclusion of the heating and pressing step. In other embodiments, other types of composite panel components can be formed. For example, a heating and pressing step in another embodiment could output a composite panel that is subsequently joined to one or more other components to create an upper shell. Those other components could be other composite panels formed in a similar manner, could be components cut from sheets of material, and/or could be components created in some other manner.

Figure 10:
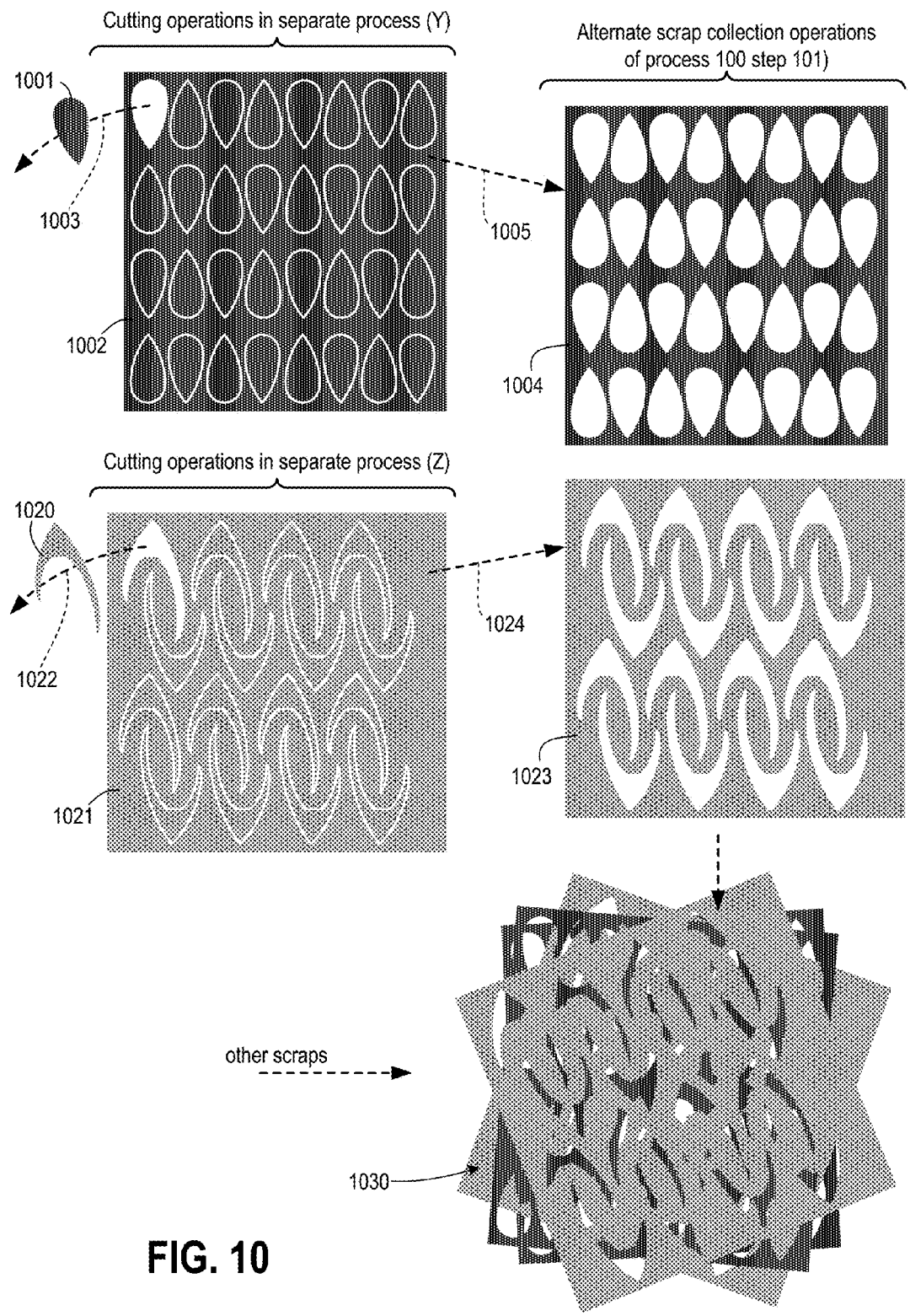
FIG. 10 shows collection of material scraps according to certain additional embodiments.

As indicated above, in some embodiments collected scraps may be resized, and the resized scraps assembled to form an interim composite panel assembly in different ways. For example, FIG. 10 illustrates operations for step 101 (FIG. 2) in an embodiment where process 100 of FIG. 1 collects material scraps from cutting operations in separate processes "Y" and "Z," and where the collected material scraps are size-reduced to create recovered material panels that are larger than the scrap particles 302 discussed above in connection with FIG. 3.

Process Y includes steps to create an upper (not shown) that includes a teardrop-shaped TPU element 1001. As part of process Y, multiple elements 1001 are punched from a sheet of TPU material 1002 in one or more cutting operations 1003. Elements 1001 can then be attached to uppers in other steps (not shown) of process Y. For simplicity, FIG. 10 shows a single element 1001 removed from sheet 1002 and outlines of the other elements 1001 to be removed from sheet 1002. After all of the elements 1001 have been cut from sheet 1002, a remaining scrap 1004 is collected in an operation 1005. In the embodiment shown, scrap 1004 includes a pattern of numerous openings having the same shape as the removed elements 1001.

Process Z includes steps to create another upper (also not shown) that includes a "C" shaped 1020. As part of process Z, multiple elements 1020 are punched from a sheet 1021 in one or more cutting operations 1022. Sheet 1021 can be of the same material as sheet 1002, can be slightly different (e.g., TPU that only differs from sheet 1002 based on color), or can be very dissimilar (e.g., a woven synthetic mesh). After removal from sheet 1021, elements 1020 can be used in other steps (not shown) of process Z. For simplicity, FIG. 10 similarly shows a single element 1020 removed from sheet 1021 and outlines of the other elements 1020 to be removed from sheet 1021. After all of the elements 1020 have been cut from sheet 1021, a remaining scrap 1023 is collected in an operation 1024. In the embodiment shown, scrap 1023 includes a pattern of numerous openings having the same shape as the removed elements 1020.

Scraps 1004 and 1023 are combined with other scraps (e.g., from other iterations of operations 1005 and 1024) to create collected scraps 1030. Unlike the scraps 230 of FIG. 2, however, resizing of collected scraps 1030 will produce larger sections of recovered material for inclusion in an interim composite panel assembly. In particular, and as shown in more detail below, those recovered material sections will comprise panels that still include at least portions of the patterns formed in scraps 1004 and 1023 by removal of elements 1001 and 1020, respectively.

Figure 11A:
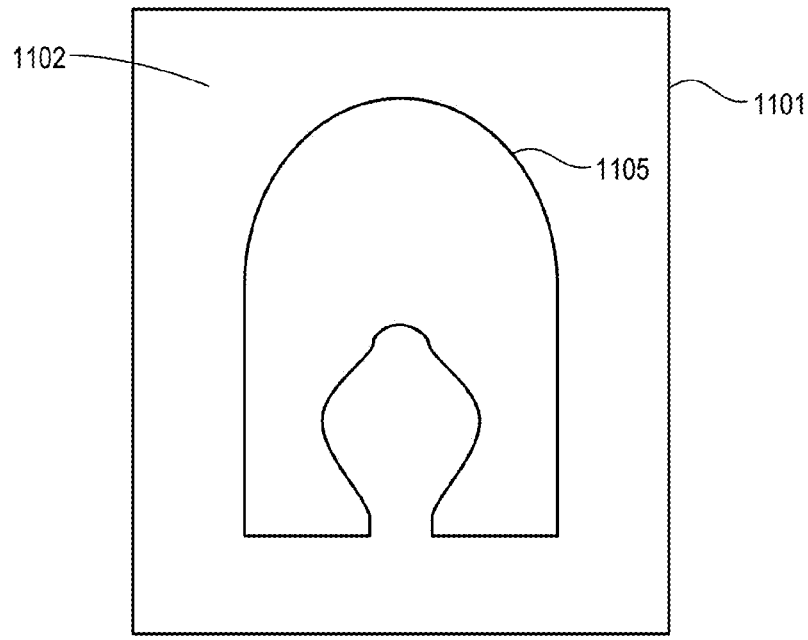
FIGS. 11A through 11D show assembly of composite panel elements according to certain additional embodiments.
Figure 11B:
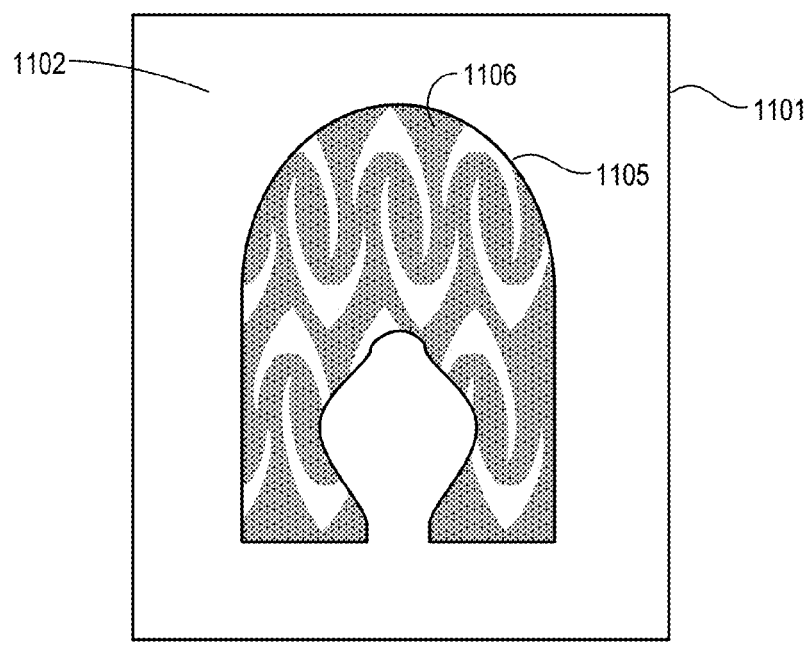
Figure 11C:
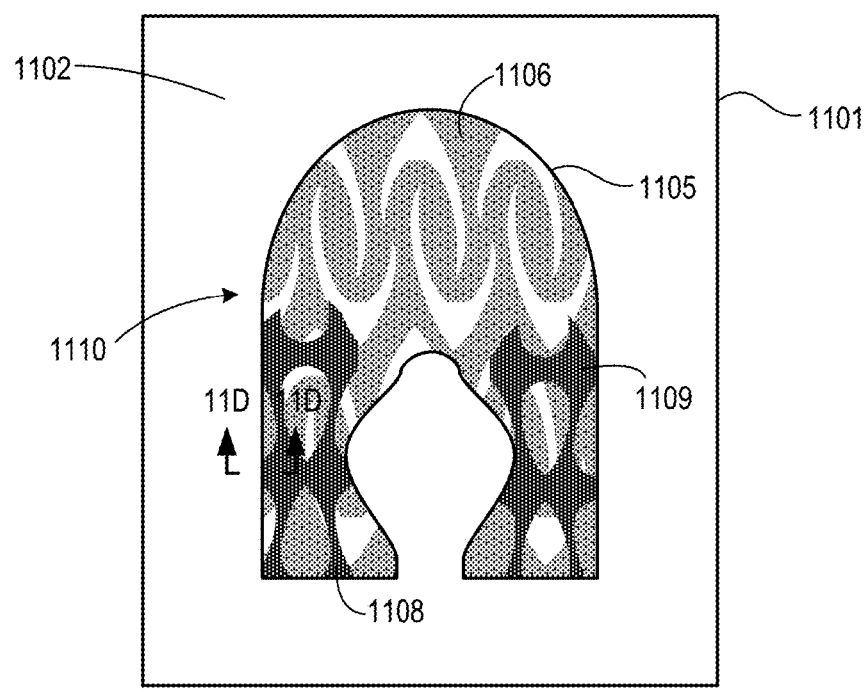

FIGS. 11A through 11C show operations to create an interim composite panel assembly that includes recovered material elements obtained from scraps 1030. The operations of FIGS. 11A through 11C, similar to the operations 4A through 4C, could be operations of step 107 (FIG. 1) according to some embodiments. In FIG. 11A, an inner panel 1105 is placed on a working surface 1102 of a lower plate 1101. Panel 1105 could be similar to panel 405 and could be formed from any of the above-mentioned materials that might be used for panel 405. Surface 1102 and plate 1101 may be similar to surface 402 and plate 401 described above. Similar to panel 405 described in connection with in previous embodiments, panel 1105 will serve as an inner carrier for recovered materials. Release paper or another release agent may be interposed between panel 1105 and surface 1102.

In FIG. 11B, a recovered material panel 1106 is placed onto panel 1105. Recovered material panel 1106 was cut from one or more of scraps 1023 in collected scraps 230. In the embodiment shown, panel 1106 is generally the same size and shape as panel 1105. In other embodiments, panel 1106 may have a different shape and/or cover less or more than all of panel 1105. Depending on the type of TPU from which sheet 1002 (FIG. 10) is formed, additional TPU or other heat-activated bonding agent may be placed between panel 1105 and panel 1106 if needed.

Figure 11D:
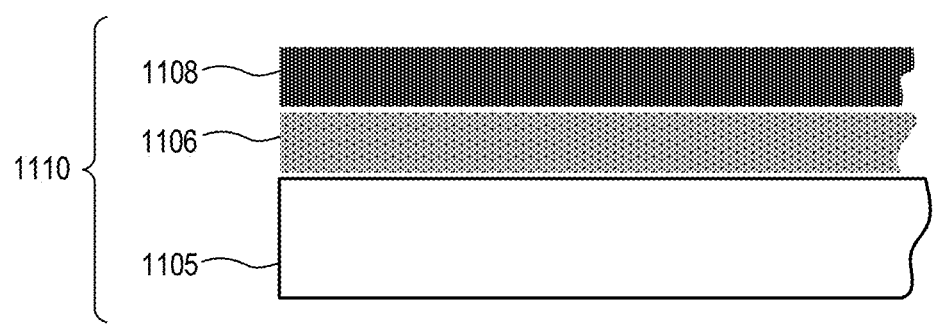

In FIG. 11C, recovered material panels 1108 and 1109 are placed onto panel 1106 in the locations shown so as to create assembly 1110. Each of recovered material panels 1108 and 1109 was cut from one or more of scraps 1023 in collected scraps 1030. FIG. 11D is an enlarged cross-sectional view of assembly 1110 from the location shown in FIG. 11C. Depending on the type of material from which sheet 1021 (FIG. 10) is formed, additional TPU or other heat-activated bonding agent may be placed between panels 1108 and 1106 and between panels 1109 and 1106 if needed.

Figure 11E:
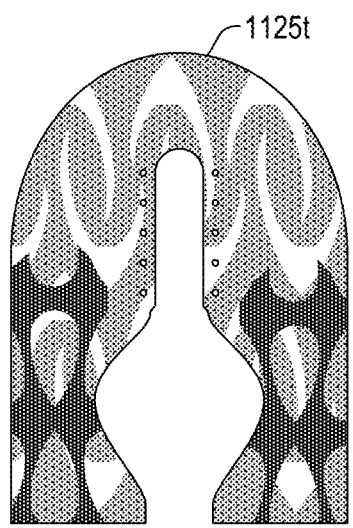
FIG. 11E shows an upper shell after trimming.

In the embodiment of FIGS. 11A through 11C, and unlike the embodiment of FIGS. 4A-8, no additional panel is placed onto assembly 1110. Instead, panels 1106, 1108 and 1109 will be exposed on the outer surface of the pliable composite panel being formed. A sheet of release paper can be placed over assembly 1110. An upper plate similar to plate 501 may then be placed over lower plate 1101 and assembly 1110 in a manner similar to that shown and described in connection with FIG. 5A. The plates and assembly 1110 may then be pressed in a manner similar to that shown and described in connection with FIG. 5B, resulting in a pliable composite panel in which the panels 1105, 1106, 1108 and 1109 are bonded. FIG. 11E shows that composite panel, after trimming in a manner similar to that shown and described in connection with FIG. 6, to create an upper shell 1125$t$. Shell 1125$t$ can then undergo further operations similar to those shown and described in connection with FIGS. 7 and 8 to create a completed shoe (not shown).

Figures 12A, 12B, 12C:
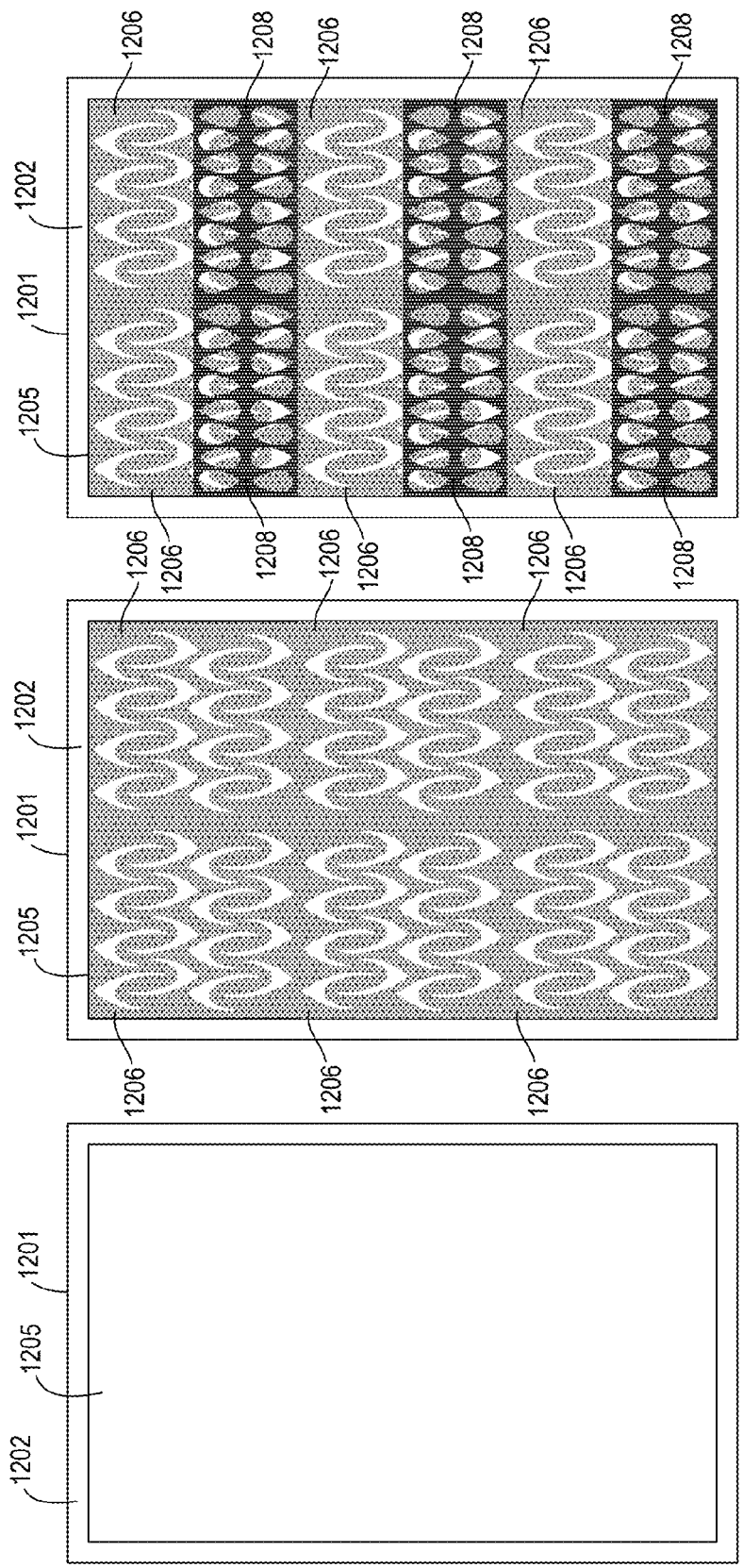
FIGS. 12A through 12C show creation, according to some embodiments, of a pliable composite panel in the form of a stock material sheet.

In the examples thus far, recovered material particles or larger recovered material panels were placed onto assemblies that would, with the exception of trimmings that might be later recycled, be used to form a composite panel in the shape of a single upper shell. In other embodiments, recovered materials can be used to form a pliable composite panel in the shape of a stock sheet from which multiple upper shells or other articles can be cut. For example, and as shown in FIG. 12A, a large sheet of material 1205 has been placed onto a surface 1202 of a lower plate 1201. Sheet 1205 is similar to panel 405, and could be formed from any of the above-mentioned materials that might be used for panel 405, but is rectangular in shape and has a substantially larger area. Plate 1201 and face 1202 are similar to plate 401 and face 402, respectively, but also have a larger area. Release paper or other release agent, not shown, can be placed between sheet 1205 and surface 1202.

In FIG. 12B, six recovered material panels 1206 have been placed on top of sheet 1205 in abutting positions. Each of panels 1206 was cut from one or more scraps 1023 in collected scraps 1030. Depending on the type of TPU from which sheet 1002 (FIG. 10) is formed, additional TPU or other heat-activated bonding agent may be placed between sheet 1205 and panels 1206 if needed. In FIG. 12C, six recovered material panels 1208 have been placed on top of sheets 1206. Each of panels 1208 was cut from one or more scraps 1023 in collected scraps 1030. Depending on the type of material from which sheet 1021 (FIG. 10) is formed, additional TPU or other heat-activated bonding agent may be placed between panels 1208 and 1206 if needed.

The resulting assembly 1210 in FIG. 12C can then be pressed in a manner similar to that described above in connection with assemblies 411 and 1110. In particular, a sheet of release paper or other release agent can be placed between assembly 1210 and an upper plate, with the upper plate being similar to plate 501 but of the same size as plate 1201. After that upper plate is placed on top of assembly 1210 and plate 1201, the plates are pressed in a manner similar to that shown and described in connection with previous embodiments.

Figure 12D:
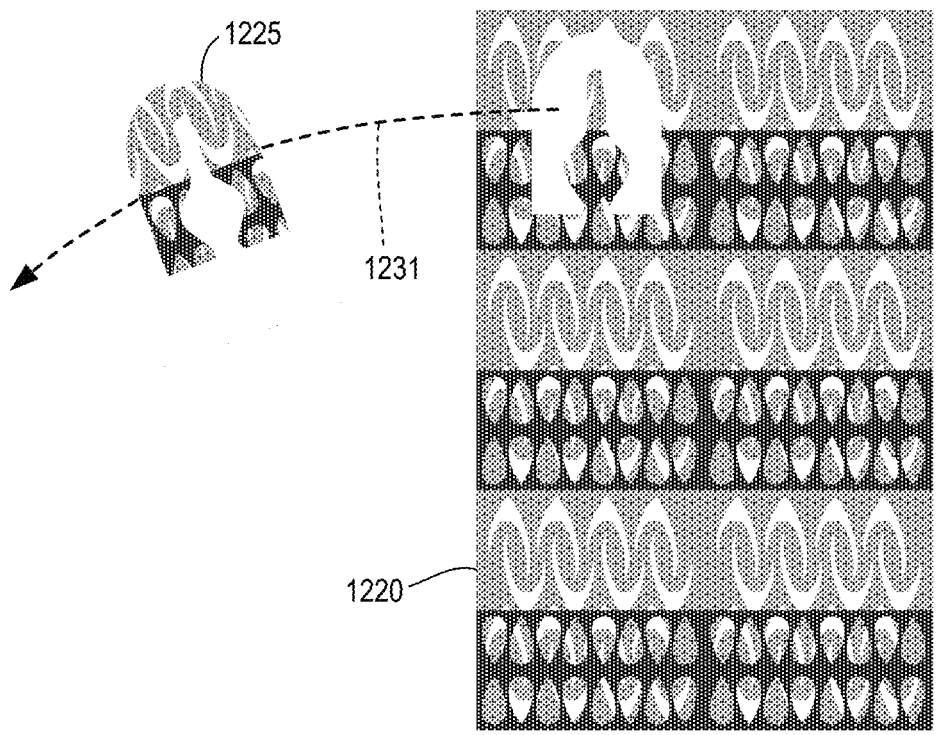
FIG. 12D shows cutting of an upper shell from the pliable composite panel of FIGS. 12A-12C.

FIG. 12D shows a pliable composite panel in the form of a pliable stock sheet 1220 that results after completion of those pressing operations, and in which sheet 1205, panels 1206 and panels 1208 have been bonded. Multiple upper shells and/or other articles can then be cut from sheet 1220. FIG. 12D shows an example of one such upper shell 1225 being cut from sheet 1220 in a cutting operation 1231. Additional upper shells (or other articles) can be cut from sheet 1220. Any scraps of sheet 1220 that remain after cutting of additional articles could then be collected and recycled in a manner similar to that described in connection with previous embodiments.

In other embodiments, recovered material particles (e.g., particles similar to particles 302 described above) could be used to create a stock material sheet having a structure (and formed in a manner) similar to that described in connection with FIGS. 4A-5D and/or FIG. 9, but in which the resulting composite panel is in the form of a stock sheet instead of a flattened upper shell. In still other embodiments, recovered material particles could be used in combination with larger recovered material panels (e.g., panels 1206 and 1208 described above) to form a stock material sheet.

In some embodiments, scrap particles output from a grinder or other resizing machine can be matted together in a felting process (e.g., using barbed needles) so as to create a sheet of recovered material. Desired shapes could then be cut from such a sheet and located in a desired position of an assembly so as to form a recovered material layer. In some embodiments, a sheet of recovered materials could be created by mixing finely scrap particles with a sprayed adhesive.

Figure 13A:
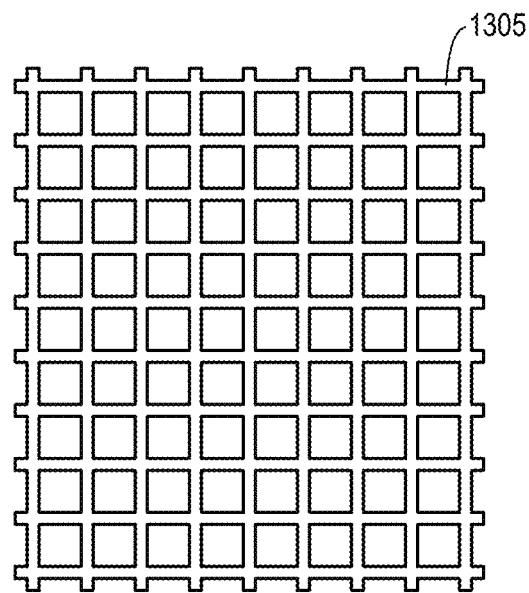
FIGS. 13A-13E show use of felting according to some embodiments.
Figure 13B:
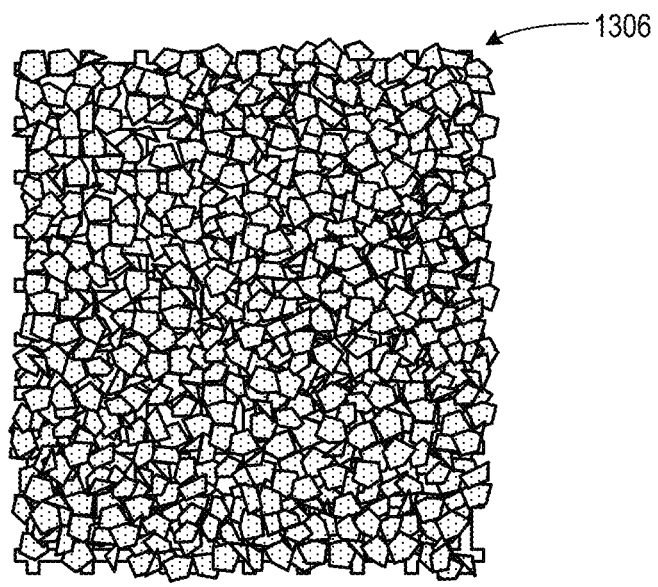
Figure 13C:
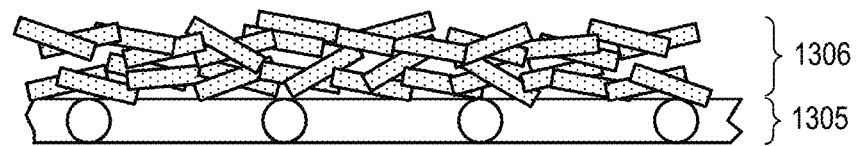
Figure 13D:
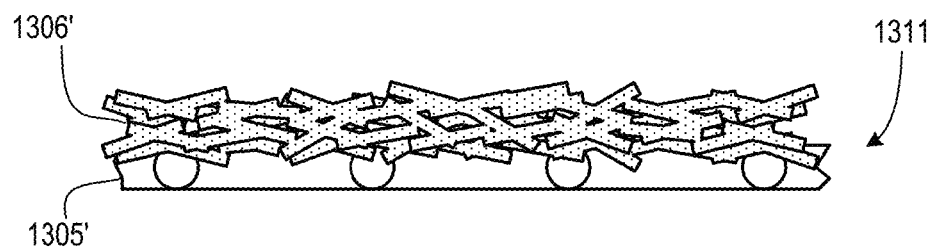
Figure 13E:
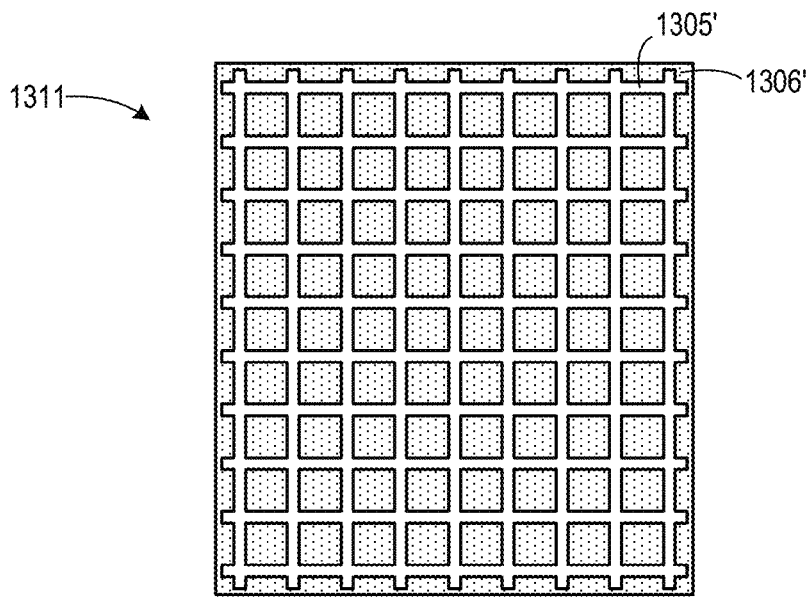

Felting could be employed in various other manners. FIGS. 13A-13E shows one example of how felting can be employed in some embodiments to incorporated recovered materials into a composite panel. A panel of scrim material 1305 can be placed upon a felting machine work surface (not shown) in FIG. 13A. Scrim material 1305 can be, e.g., a natural or synthetic mesh material or another type of textile material. In FIG. 13B, a layer 1306 of recovered material particles (e.g., particles similar to particles 302) is distributed across scrim panel 1305. FIG. 13C is an enlarged, partially schematic end view of a portion of the scrim 1305 and particle layer 1306 assembly of FIG. 13B. As shown in FIG. 13C, the particles of layer 1306 are not bonded to each other or to scrim 1305. The assembly of FIG. 13B subsequently undergoes felting. In particular, multiple barbed needles of a felting machine repeatedly penetrate layer 1306 and scrim 1305 so as to mat and mechanically interconnect the particles of layer 1306 and scrim 1305. FIG. 13D is an enlarged, partially schematic end view of a portion of the resulting panel 1311. FIG. 13E is a view of the entire panel 1311 from the scrim side. Panel 1311 could then be further processed if desired (e.g., the scrim side could be coated or a skin layer or other panel applied) before being used as a substrate for further compositing operations or as a stock material panel. Scrim 1305 can be chosen so as to add strength to an underlying recovered material layer. Scrim 1305 can also be chosen so as to achieve a desired aesthetic effect by, e.g., selecting a desired mesh color and/or selecting a desired mesh pattern to create a particular surface texture.

Other embodiments include use of felting in a manner similar to that shown in FIGS. 13A-13E, but in which larger or smaller particles and/or recovered material panels are used in layer 1306.

Additional embodiments include numerous variations on the processes and articles described thus far. Set forth below are non-exclusive examples of additional embodiments.

Many embodiments may comprise pliable composite panels that include recovered material elements, but in which the constructions of such panels may vary from those of certain embodiments discussed thus far. As indicated above, a composite panel such as that produced in an embodiment according to FIGS. 4A through 8 may omit an upper or lower carrier layer. Conversely, a composite panel such as shell 1125*t* or sheet 1220 could include an outer carrier layer. More than two carrier layers may be included (e.g., a panel may include one or more interior carrier layers). An inner and/or outer carrier layer need not extend the full length of a composite panel. In some embodiments, a carrier layer may itself be (or be cut from) a composite panel that includes recovered material elements. For example, sheet 1230 (or a portion thereof) or panel 1311 could serve as a carrier layer for a subsequently produced composite panel.

In certain embodiments according to FIGS. 4A through 8, the produced composite panel only includes a recovered material element formed from scrap particles. Conversely, the produced composite panels in certain embodiments according to FIGS. 11A through 11E and FIGS. 12A through 12D only include recovered material elements formed from relatively large scrap material panels. Other embodiments can include recovered material elements formed from scrap material panels that are larger or smaller than those shown in the embodiments of FIGS. 11A through 11E and FIGS. 12A through 12D. Still other embodiments can include composite panels in which one or more recovered material elements are formed from scrap particles and one or more other recovered material elements are formed from scrap material panels.

In certain embodiments according to FIG. 2, collected scraps are ground to create scrap particles. In certain embodiments according to FIG. 10, collected scraps are trimmed or otherwise size-reduced (e.g., with scissors, cutting dies, etc.) to obtain scrap material panels. In at least some embodiments, the same scrap can be used for both purposes. For example, a scrap similar to any of scraps 215-218, 222, 227 or 228 in FIG. 2 or similar to any of scraps 1004 and 1023 in FIG. 10 could be trimmed to create one or more scrap panels, with the remainder of that scrap then ground to create scrap particles.

Scraps need not be limited to scraps that remain after elements have been cut from a stock sheet such as is depicted in FIGS. 2 and 10. Other types of scrap that can be collected, ground (or otherwise resized) and incorporated into a recovered material layer or other recovered material element include (but are not limited to) the following: threads and other small pieces of textile or other woven materials; pieces of and/or shavings from foam, rubber or other materials; pieces remaining from fabrication of fluid-filled support cushions; pieces of natural leather; scraps from processes to fabricate goods other than footwear; and scraps from synthetic, natural, woven and nonwoven materials in addition to those specifically identified herein. In some embodiments, scraps may include defective articles (e.g., a fabricated upper or other article that failed a quality control inspection).

As previously indicated, additional embodiments also include non-footwear articles that include composite panels incorporating recovered material elements. For example, composite panels similar to those described herein, and created using processes similar to those described herein, can be used to create pliable composite panels for incorporation into articles such as apparel (e.g., hats, belts, outerwear, etc.), luggage (e.g., equipment bags, handbags, shopping bags), sporting equipment (e.g., padding, padding harnesses, etc.), and a large variety of other articles. As but one illustration thereof, panels for a handbag could be cut from a stock sheet such as sheet 1220 of FIG. 12D. As but another illustration thereof, a panel having the shape of a panel for a jacket could serve as a carrier for a recovered material layer formed from scrap particles and/or scrap material panels.

Still other embodiments include processes (and articles produced through such processes) that utilize additional fabrication techniques. For example, finely ground scrap particles could be combined, heated and extruded as a sheet or other shape. As another example, longer lengths of stock material similar to sheet 1220 could be created using heated rollers instead of plates such as plate 1201. As yet another example, composite panels may include scrap material panels that have been attached to carrier panels and/or to other scrap material panels using stitching, using no-sew bonding tape, using ultrasonic welding, etc.

The foregoing description of embodiments has been presented for purposes of illustration and description. The foregoing description is not intended to be exhaustive or to limit embodiments to the precise form explicitly described or mentioned herein. Modifications and variations are possible in light of the above teachings or may be acquired from practice of various embodiments. The embodiments discussed herein were chosen and described in order to explain the principles and the nature of various embodiments and their practical application to enable one skilled in the art to make and use these and other embodiments with various modifications as are suited to the particular use contemplated. Any and all permutations of features from above-described embodiments are the within the scope of the invention. References in a claim to characteristics of a physical element relative to a wearer of claimed article or of an article produced by a claimed process do not require actual wearing of the article in order to be within the scope of the claim.

The invention claimed is:

1. A method comprising:
    distributing material scraps on a first carrier panel so as to form a recovered material layer from the distributed material scraps, wherein
        the material scraps include thermoplastic polyurethane (TPU) particles having areas of 250 square millimeters or less, the TPU particles formed from resized TPU remnants,
        the material scraps include additional material particles having areas of 250 square millimeters or less, the additional material particles formed from resized remnants of at least one other type of material,
        the TPU particles and the additional material particles are commingled in the recovered material layer, and
        the first carrier panel has an area at least as large as an area of a flattened shell of a footwear upper;
    placing a second carrier panel over the recovered material layer so as to situate the recovered material layer between the first and second carrier panels, wherein the second carrier panel has an area at least as large as the area of the flattened shell of the footwear upper;
    simultaneously applying heat and pressure to the first and second carrier panels having the recovered material layer situated between the first and second carrier panels so as to melt the resized TPU remnants;
    allowing the recovered material layer to cool and form a pliable composite panel, and wherein the composite panel comprises the recovered material layer bonded to the first carrier panel and to the second carrier panel; and
    forming the footwear upper from at least a portion of the pliable composite panel.

2. The method of claim 1, wherein the material scraps comprise resized remnants of materials used to fabricate an article of footwear.

3. The method of claim 1, wherein the material scraps consist essentially of coarsely ground particles, and wherein the recovered material layer remains substantially heterogeneous after the applying heat and pressure.

4. The method of claim 1, wherein the material scraps consist essentially of finely ground particles, and wherein the recovered material layer is substantially homogenous after the applying heat and pressure.

5. The method of claim 1, wherein the at least one other type material comprises a synthetic leather.

6. The method of claim 1, wherein the at least one other type material comprises a mesh material.

7. The method of claim 1, further comprising
    collecting scrap materials that include a trimming from the composite panel;
    resizing the collected scrap materials to create scrap particles;
    distributing the scrap particles to form a second recovered material layer;
    applying heat and pressure to the second recovered material layer so as to create a second composite panel; and
    forming a shoe upper that includes at least a portion of the second composite panel.

8. The method of claim 1, wherein at least one of the first and second carrier panels comprises a polyurethane panel.

9. The method of claim 8, wherein the composite panel has a shape generally corresponding to the flattened shell of the footwear upper, and further comprising
    joining edges of the flattened shell to create a shell defining an ankle opening and having a shape at least approximating the shape of the footwear upper.

10. The method of claim 1, wherein the resized TPU remnants comprise resized remnants of a TPU material used to fabricate an article of footwear.

11. The method of claim 1, wherein the resized remnants of the at least one other type of material comprise resized remnants of a material used to fabricate an article of footwear.

12. The method of claim 1,
    wherein the applying heat and pressure to the first and second carrier panels having the recovered material layer situated therebetween comprises pressing between plates having a pattern of blades formed therein, the pattern of blades pinching and heating the recovered material layer along grid lines corresponding to the pattern of blades.

13. The method of claim 1, wherein the first carrier panel has a shape that generally corresponds to the flattened shell, and wherein the second carrier panel has a shape that generally corresponds to the flattened shell.

14. The method of claim 13, wherein the TPU particles have areas of 100 square millimeters or less and the additional material particles have areas of 100 square millimeters or less.

\* \* \* \* \*